(12) United States Patent
Watanabe et al.

(10) Patent No.: US 8,427,024 B2
(45) Date of Patent: Apr. 23, 2013

(54) STATOR

(75) Inventors: Atsushi Watanabe, Toyota (JP); Fujio Ando, Nagoya (JP); Masayoshi Haga, Nagoya (JP); Manabu Kitamura, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 223 days.

(21) Appl. No.: 13/131,828

(22) PCT Filed: Dec. 18, 2009

(86) PCT No.: PCT/JP2009/071147
§ 371 (c)(1),
(2), (4) Date: May 27, 2011

(87) PCT Pub. No.: WO2011/074114
PCT Pub. Date: Jun. 23, 2011

(65) Prior Publication Data
US 2012/0025658 A1    Feb. 2, 2012

(51) Int. Cl.
*H02K 3/04* (2006.01)
*H02K 15/04* (2006.01)

(52) U.S. Cl.
USPC ........... 310/179; 310/195; 310/203; 310/207; 310/180; 310/208

(58) Field of Classification Search ............ 310/207, 310/206, 195, 208, 180, 179
See application file for complete search history.

(56) References Cited

U.S. PATENT DOCUMENTS

| | | | | |
|---|---|---|---|---|
| 3,631,278 | A * | 12/1971 | Snively | 310/158 |
| 6,140,735 | A * | 10/2000 | Kato et al. | 310/201 |
| 6,373,164 | B1 * | 4/2002 | Nishimura | 310/207 |
| 6,762,528 | B2 * | 7/2004 | Wada et al. | 310/201 |
| 7,825,562 | B2 * | 11/2010 | Naganawa et al. | 310/208 |
| 7,923,884 | B2 * | 4/2011 | Seguchi et al. | 310/201 |
| 8,193,675 | B2 * | 6/2012 | Ishizuka et al. | 310/201 |
| 2001/0043018 | A1* | 11/2001 | Haydock et al. | 310/71 |
| 2002/0057031 | A1* | 5/2002 | Ueda et al. | 310/208 |
| 2005/0012425 | A1* | 1/2005 | Tsukamoto et al. | 310/218 |
| 2005/0189833 | A1* | 9/2005 | Liao | 310/179 |
| 2006/0006757 | A1* | 1/2006 | Seguchi | 310/184 |
| 2007/0018527 | A1* | 1/2007 | Neet | 310/207 |

FOREIGN PATENT DOCUMENTS

| | | |
|---|---|---|
| JP | 55-095441 U | 7/1980 |
| JP | 61-293129 A | 12/1986 |
| JP | 02-060444 A | 2/1990 |

(Continued)

*Primary Examiner* — Tran Nguyen
*Assistant Examiner* — Terrance Kenerly
(74) *Attorney, Agent, or Firm* — Kenyon & Kenyon LLP

(57) ABSTRACT

To provide a stator capable of achieving downsizing and high output power and a stator manufacturing method, a stator comprises a split stator core and slots formed between the teeth, and protrusion-formed coils each being made of a flat rectangular conductor and placed in the slots. Each protrusion-formed coil has a shape including, in a coil end portion, a lead-side protrusion or a non-lead-side protrusion formed to protrude upward in an axial direction of the stator core from a first oblique side portion, a second oblique side portion, a third oblique side portion, and a fourth oblique side portion, and a first oblique side portion, a second oblique side portion, a third oblique side portion, and a fourth oblique side portion. The lead-side protrusion or the non-lead-side protrusion is designed with a height to avoid interference between the protrusion-formed coils placed in the stator core.

4 Claims, 29 Drawing Sheets

FOREIGN PATENT DOCUMENTS

| | | |
|---|---|---|
| JP | 2001-231203 A | 8/2001 |
| JP | 2004-201465 A | 7/2004 |
| JP | 3756516 A | 3/2006 |
| JP | 2008-099441 A | 4/2008 |
| JP | 2008-125212 A | 5/2008 |
| JP | 2009-011152 A | 1/2009 |
| JP | 4234749 A | 3/2009 |
| JP | 2009-131093 A | 6/2009 |
| WO | 2011/055438 A1 | 5/2011 |

* cited by examiner

STATOR

CROSS-REFERENCE TO RELATED APPLICATIONS

This is a 371 national phase application of PCT/JP2009/071147 filed 18 Dec. 2009, the entire content of which is incorporated herein by reference.

FIELD OF THE INVENTION

The present invention relates to a technique to improve the space factor of a stator to achieve a downsized and high-power motor.

BACKGROUND OF THE INVENTION

In recent years, the needs for hybrid electric vehicles, electric vehicles, and others have been increased. Accordingly, motors have been studied to be used for the driving power of vehicles. However, such motors to be mounted in the vehicles are demanded for high power and downsizing. Particularly, hybrid electric vehicles are strictly demanded for size reduction in view of the placement of a motor in an engine room.

Therefore, various studies have been made to achieve downsizing and high power of motors.

Patent Literature 1 discloses a technique related to a conductor part for stator frame in a multi-phase power generator.

A stator core includes outer slots. A flat rectangular conductor provides a plane of an in-slot conductor portion to be inserted in each slot. The flat rectangular conductor is shaped into an almost U-like form when seen in plan view perpendicularly to the plane and a sinuous form when seen in front view along the plane. Such flat rectangular conductor is set in the stator core. Accordingly, a coil end of the stator can be shortened, thereby improving the space factor.

Patent Literature 2 discloses a technique related to a crank-shaped consecutively wound coil, a distributed winding stator, and a method of forming them.

After a flat rectangular conductor is wound in hexagon shape, a crank-shaped portion serving as a coil end is formed by a die. Such flat rectangular conductor is placed in a stator core to eliminate interference between coils in the coil end, thus contributing to an increase in the space factor of the stator and a reduction in size.

Patent Literature 3 discloses a technique related to a rotary electric machine and a manufacturing method thereof.

When a coil assembly wound from an inner circumferential side to an outer circumferential side is to be placed in slots of a stator core, the coil assembly is inserted from the coil outer circumferential side in an outer layer side of one slot and from the coil inner circumferential side in an inner layer side of the other slot. Accordingly, the rotary electric machine including distributed winding coils can be manufactured in a simplified work and also can have an improved space factor of the slots.

Patent Literature 4 discloses a technique related to a stator of a rotary electric machine, and the rotary electric machine.

A flat rectangular conductor is wound in wave form to form a wound coil having a plurality of phases. Split teeth are inserted from outside and fixed in grooves in an outer annular portion of a stator core. Thus, the stator core can be manufactured with high precision.

CITATION LIST

Patent Literature

Patent Literature 1: JP 3756516 B2
Patent Literature 2: JP 4234749 B2
Patent Literature 3: JP 2008-125212 A
Patent Literature 4: JP 2009-131093 A

SUMMARY OF INVENTION

Technical Problem

However, Patent Literatures 1 to 4 may cause the following problems.

In general, a stator using a distributed winding coil can be more developed for high power as compared with a stator using a concentrated winding coil and hence can more easily solve the problem with cogging torque. However, if the depth of slots in the stator cores are made larger and the number of turns of a coil is increased to develop high power of the stator using the distributed coil as shown in Patent Literatures 1 and 2, a problem with interference between coils occurs.

In the techniques disclosed in Patent Literatures 1 and 2, there is little clearance between adjacent coils. It therefore seems difficult to increase the number of turns of each coil any more. In shaping a flat rectangular conductor, the bending radius of the flat rectangular conductor is restricted. Thus, it also seems hard to increase a cross-sectional area of the flat rectangular conductor any more.

Consequently, the methods in Patent Literatures 1 and 2 are considered unsuitable for further development of high power.

Patent Literature 3 shows only a concrete method of shaping a coil by winding a circular wire from inner to outer circumference into a flat shape to form a coil, clamping a portion of the coil to be inserted in a slot, then twisting that portion. This method seems unsuitable for a flat rectangular conductor.

Because of the use of a manner of winding the flat rectangular conductor by stacking or overlapping the conductor on the outer circumference, a coil end tends to become large. This seems inadequate for downsizing of a stator.

Patent Literature 4 uses a wave winding coil in distributed winding. The wave winding coil needs weaving of a flat rectangular conductor. This requires a complicated forming work and also a large-sized assembling machine to stack all the flat rectangular conductors in a planar manner and then wind the stacked flat rectangular conductors into an annular ring shape. Accordingly, there occur problems that assembling is difficult and cost reduction is hard to achieve.

Consequently, in view of the techniques shown in Patent Literatures 1 to 4, additional devices or ideas are necessary to more reduce the size and develop the high power of a stator.

The present invention has been made to solve the above problems and has a purpose to provide a stator capable of achieving downsizing and high power.

Solution to Problem

To achieve the above purpose, one aspect of the invention provides the following configurations.

(1) A stator comprises: a stator core including teeth and slots formed between the teeth; and coils each being made of a flat rectangular conductor and placed in the slots, wherein each coil has a shape including, in a coil end portion, oblique side portions and a protrusion formed to protrude upward in an axial direction of the stator core from the oblique side portions, and the protrusion has a height to avoid interference between the coils placed in the stator core, and the coil end portion of each coil is formed with a lane-change portion, a coil interference-point distance A1 between a first interference point P3 at which a first coil and a second coil arranged adjacently interfere with each other and a second interference point P4 at which the second coil and a third coil arranged adjacently interfere with each other is determined to be equal to or shorter than a bending center-to-center distance A defined as a distance in a circumferential direction of the stator core between a bending center on an inner circumferential side of the lane-change portion located on the inner circumferential side of the stator core and a bending center on an outer circumferential side of the lane-change portion located on the outer circumferential side of the stator core.

(2) In the stator in (1), preferably, the flat rectangular conductors are stacked and formed with the protrusions and the lane change portions.

(3) In the stator in (1) or (2), preferably, each coil is wound in a concentric winding pattern, and the coils are arranged cylindrically to form a cage coil, and the split stator core is inserted in the cage coil.

(4) In the stator in (3), preferably, the slots consist of three-phase slot blocks sequentially formed including a first group of a U-phase first slot, a U-phase second slot, a V-phase first slot, a V-phase second slot, a W-phase first slot, and a W-phase second slot, and a second group of the three-phase slot blocks is formed adjacent to the first group, the flat rectangular conductor in the U-phase first slot of the first group and the flat rectangular conductor in the U-phase second slot of the second group form, in combination, a first loop, the flat rectangular conductor in the U-phase second slot of the first group and the flat rectangular conductor in the U-phase first slot of the second group form, in combination, a second loop, and the second loop is placed on an inner circumference of the first loop.

(5) In the stator in (4), preferably, the flat rectangular conductor extending from the U-phase first slot is deformed for lane change in a range corresponding to two slots (two-slots range).

(6) In the stator in (5), preferably, one end of the first loop is connected to one end of the second loop.

To achieve the above purpose, another aspect of the invention provides a stator manufacturing method having the following configurations.

(7) A method of manufacturing a stator comprising: a stator core including teeth and slots formed between the teeth; and a flat rectangular conductor placed in the stator, is characterized by comprising: a first step of winding the flat rectangular conductor in plural turns to form an octagonal coil, a second step of forming a pair of protrusions in coil end portions of the octagonal coil, a third step of shaping the coil formed with the protrusions into a curved form, and a fourth step of forming a lane-change portion in each of the protrusions.

(8) In the stator manufacturing method in (7), preferably, the second step includes pressing outer surfaces of the octagonal coil by a press mechanism from four directions around the fixed octagonal coil to form the pair of protrusions.

(9) In the stator manufacturing method in (7) or (8), preferably, the third step includes fixing the protrusion-formed coil, and pressing a die having a curved surface against the coil in an axial direction of the coil to shape the coil into the curved form.

(10) In the stator manufacturing method in one of (7) to (9), preferably, the fourth step includes holding the pair of protrusions of the coil shaped into the curved form with a right holding die and a left holding die, and displacing the left holding die with respect to the right holding die to form the lane-change portions in the pair of protrusions.

To achieve the above purse, another aspect of the invention provides a stator manufacturing apparatus having the following configurations.

(11) A stator manufacturing apparatus for manufacturing a stator comprising: a stator core including teeth and slots formed between the teeth; and a flat rectangular conductor placed in the stator, is characterized by comprising a coil fixing part for fixing an octagonal coil made by winding the flat rectangular conductor in plural turns, and a press mechanism for pressing outer surfaces of the octagonal coil from four directions of the fixed octagonal coil to form a pair of protrusions in the octagonal coil.

(12) The stator manufacturing apparatus in (11) preferably comprises a fixing mechanism for fixing both ends of the coil formed with the protrusions, a die having a curved surface against which the protrusion-formed coil is pressed in the axial direction, and the protrusion-formed coil is shaped into a curved form.

(13) The stator manufacturing apparatus in (12) preferably comprises a right holding die and a left holding die for holding the pair of protrusions of the coil shaped into the curved form, and a drive mechanism for displacing the left holding die with respect to the right holding die, and the lane-change portion is formed in the pair of protrusions of the coil shaped into the curved form.

Advantageous Effects of Invention

The stator in one aspect of the invention configured as above can provide the following operations and advantages.

In the aspect in (1), a stator comprising: a stator core including teeth and slots formed between the teeth; and coils each being made of a flat rectangular conductor and placed in the slots, wherein each coil has a shape including, in a coil end portion, oblique side portions and a protrusion formed to protrude upward in an axial direction of the stator core from the oblique side portions, the protrusion has a height to avoid interference between the coils placed in the stator core, and the coil end portion of each coil is formed with a lane-change portion, a coil interference-point distance A1 between a first interference point P1 at which a first coil and a second coil arranged adjacently interfere with each other and a second interference point P2 at which the second coil and a third coil arranged adjacently interfere with each other is determined to be equal to or shorter than a bending center-to-center distance A defined as a distance in a circumferential direction of the stator core between a bending center on an inner circumferential side of the lane-change portion located on the inner circumferential side of the stator core and a bending center on an outer circumferential side of the lane-change portion located on the outer circumferential side of the stator core.

Since the protrusion protruding from the oblique side portions in the coil end of the coil, it is easier to avoid the interference between coils when the coils are inserted in the stator core. Thus, shortening of the coil ends is achieved.

The coil end portions of the stator need to be arranged to avoid the interference between the coils. However, the coils intersect three-dimensionally in complex form in the coil end portions. Accordingly, it is possible to form the protrusions in order to avoid the interference with the adjacent coils. Avoiding the interference enables efficient shortening of the coil end portions.

For instance, when a coil is to be wound into a hexagonal form, two sides in a coil end protrude like an isosceles triangle. In this case, if isosceles triangular portions of the coils are arranged to detour around one another, a distance (an interval) needs to be provided between the coils in view of the thickness of the flat rectangular conductor (conductor wire). Accordingly, a width (range) is required for lane change.

However, the first protrusion and the second protrusion provided in each coil can facilitate avoidance of the interference between the adjacent coils.

When the first loop and the second loop are to be formed, an edge-wise bending process is necessary in the light of stator structure. However, the first protrusion and the second protrusion are formed by bending the conductor in a direction of thinner thickness, not an edge-wise bending direction. Thus, a bending radius is small and hence the conductor can be bent relatively easily.

As a result, the design freedom of the stator can be enhanced. This contributes to easy connection with a bus bar by extending a coil terminal portion under the first loop and the second loop to the outside without extending the coil end so long.

High design freedom makes the process simpler to manufacture the stator. It is highly advantageous.

Further, the coil interference-point distance is set to be the bending center distance or less, so that the first coil, the second coil, and the third coil can be arranged adjacently, thereby shortening pitches between slots in the stator core. This can contribute to downsizing of the stator.

In the configuration in (3) according to the stator in (1) or (2), each coil is wound in a concentric winding pattern, and the coils are arranged cylindrically to form a cage coil, and the split stator core is inserted in the cage coil.

Since a method of forming the stator by cylindrically arranging the concentrically wound coils to form a cage coil, and inserting a split stator core in the cage coil, the design freedom of the coil can be enhanced.

In the configuration in (4) according to the stator in (3), the slots consist of three-phase slot blocks sequentially formed including a first group of a U-phase first slot, a U-phase second slot, a V-phase first slot, a V-phase second slot, a W-phase first slot, and a W-phase second slot, and a second group of the three-phase slot blocks is formed adjacent to the first group, the flat rectangular conductor in the U-phase first slot of the first group and the flat rectangular conductor in the U-phase second slot of the second group form, in combination, a first loop, the flat rectangular conductor in the U-phase second slot of the first group and the flat rectangular conductor in the U-phase first slot of the second group form, in combination, a second loop, and the second loop is placed on an inner circumference of the first loop.

The flat rectangular conductor is a double stacked coil ("double coil") including the first loop and the second loop, so that more margin for the lane change can be ensured.

When the coil made of the flat rectangular conductor into a loop is to be inserted in the stator core, the flat rectangular conductor is arranged in planar manner on the end face of the stator core as shown in Patent Literatures 1 and 2. In this case, the end face of the stator core has a limited area and thus it is difficult to increase the number of flat rectangular conductors to increase the number of coil turns. In the case of arranging the coils in distributed winding pattern, the concentrically wound coils interfere with each other. Thus, the lane change portion is necessary in the coil end portion. In this lane change portion, the coil width is apt to become problematic.

Therefore, the double coil structure including the second loop in the inner circumference of the first loop as in the present invention allows the end face of the stator core to be utilized three-dimensionally. As a result, the number of coil turns can be increased. Even when the number of turns is increased, the adjacent coils in the lane change portion can be prevented from interfering with each other.

Since the double coil consists of the stacked first and second loops, the stator core having deep slots can be adopted without increasing the thickness of the coil end so large. Consequently, the stator can satisfy enhancement of the space factor and the demand for downsizing.

In the configuration in (5) according to the stator in (4), the flat rectangular conductor extending from the U-phase first slot is deformed for lane change in a range corresponding to two slots.

The lane change is essential to adopt a concentrically wound coil and arrange a distributed winding stator. This is to avoid that each concentrically wound coil is inserted over a plurality of slots and hence adjacent coils interfere with each other in some portions.

To be concrete, assuming that a flat rectangular conductor to be inserted in a slot is referred to as an in-slot conductor portion, a first loop of a U-phase coil is arranged so that one in-slot conductor portion is inserted in a U-phase first slot of a first group and the other in-slot conductor portion is inserted in a U-phase second slot. Adjacent to them, a first loop of a V-phase coil is arranged so that one in-slot conductor portion is inserted in a V-phase first slot of the first group and the other in-slot conductor portion is inserted in a V-phase second slot of the second group.

The above first loop of the V-phase coil needs to be arranged so that a portion inserted in the U-phase first slot of the first group is placed under the first loop of the U-phase coil and a portion inserted in the U-phase second slot of the second group is placed above the first loop of the U-phase coil. To be more concrete, the first loop and the second loop are configured in double structure. One (a coil end side of the V-phase second slot of the first group) includes, sequentially from above (i.e., a far side from the end face of the stator core), a U-phase first loop, a U-phase second loop, a V-phase first loop, and a V-phase second loop. The other (a coil end side of the U-phase first slot of the second group) includes, sequentially from above (i.e., a far side from the end face of the stator core), a V-phase first loop, a V-phase second loop, a U-phase first loop, and a U-phase second loop.

The necessary lane-change portion could utilize a range corresponding to only one slot if the flat rectangular conductor is placed in planar manner on the end face of the stator core. However, the double coil in the present invention allows the lane-change portion to utilize a range corresponding to two slots, double the above, and it is preferable to prepare as wide a range as possible in relation to a bending radius.

The "range corresponding to two slots (two-slots range)" in this description represents a width corresponding to two slots and two teeth assuming that a combination of a slot and a tooth is one range corresponding to one slot.

For enhancing the space factor, it is effective to increase the cross-sectional area of the flat rectangular conductor. The bending radius is relatively larger as the cross-sectional area is wider. Accordingly, the present invention can provide a stator with a high space factor.

In the configuration in (6) according to the stator in (5), one end of the first loop is connected to one end of the second loop.

Since the first loop and the second loop of each coil are connected, no bus bar is needed for such connection after the coils are placed in the stator core. The first loop and the second loop can be connected in advance. It is therefore possible to reduce the number of bus bars and improve work space for bus bar connection.

Bus bar connection in the coil end is necessary to electrically connect the coils. However, if coils are positioned close to each other, it is apt to disturb a connecting work or cause other problems. It is conceivably necessary to connect the coils with the bus bars by detouring around the terminal portion of one of the coils in some cases.

However, by use of a method of placing the coil in which the first loop and the second loop are connected in advance in the stator core, work efficiency can be enhanced.

The stator manufacturing method in another aspect of the invention configured as above can provide the following operations and advantages.

The configuration in (7) is a method of manufacturing a state comprising: a stator core including teeth and slots formed between the teeth; and a flat rectangular conductor placed in the stator, is characterized by comprising: a first step of winding the flat rectangular conductor in plural turns to form an octagonal coil, a second step of forming a pair of protrusions in coil end portions of the octagonal coil, a third step of shaping the coil formed with the protrusions into a curved form, and a fourth step of forming a lane-change portion in each of the protrusions.

By the above method, the coil including the protrusions can be formed. When this coil is placed in the stator core, the a stator with a high space factor and a short coil end can be achieved. Even the use of the double coil including the protrusions can contribute to shortening of the coil ends. In other words, it can contribute to development of high output power and downsizing of the stator.

In the configuration in (8) according to the stator manufacturing method in (7), the second step includes pressing outer surfaces of the octagonal coil by a press mechanism from four directions around the fixed octagonal coil to form the pair of protrusions.

In many cases, the octagonal coil is made of metal having good thermal conductivity such as copper and aluminum or aluminium. These metals are easy to process. Accordingly, the octagonal coil is formed and then is fixed on a base, both sides of a portion to be shaped into a protrusion are pressed by a press mechanism, thereby forming a pair of protrusions.

In the configuration in (9) according to the stator manufacturing method in (7) or (8), the third step includes fixing the protrusion-formed coil, and pressing a die having a curved surface against the coil in an axial direction of the coil to shape the coil into the curved form.

Since the die having a curved surface is pressed against the coil formed with the protrusions to deform the coil, the coils shaped into the same curved form can be obtained. Because the coils having the same shape are stacked or overlapped to form the cage coil, their stacked portions are preferably of the same shape with high precision. The use of the die enables production of such coils.

In the configuration in (10) according to the stator manufacturing method in one of (7) to (9), the fourth step includes holding the pair of protrusions of the coil shaped into the curved form with a right holding die and a left holding die, and displacing the left holding die with respect to the right holding die to form the lane-change portions in the pair of protrusions.

When the lane-change portions are to be formed, pressure is applied to displace the right holding die from the left holding die. Thus, the lane-change portions are formed in the pair of protrusions. For stacking or overlapping the coils to form the cage coil, it is more advantageous that the precision of the stacked portions is higher than that of the lane-change portions. Since the coils are held by the right and left holding dies, the precision of the portions to be stacked to form the cage coil can be made higher.

Furthermore, the stator manufacturing apparatus in another aspect of the invention configured as above can provide the following operations and advantages.

The configuration in (11) is a stator manufacturing apparatus for manufacturing a stator comprising: a stator core including teeth and slots formed between the teeth; and a flat rectangular conductor placed in the stator, is characterized by comprising a coil fixing part for fixing an octagonal coil made by winding the flat rectangular conductor in plural turns, and a press mechanism for pressing outer surfaces of the octagonal coil from four directions of the fixed octagonal coil to form a pair of protrusions in the octagonal coil.

Since the apparatus includes the coil fixing part and the press mechanism for pressing the outer surfaces of the coil, the apparatus enables the second step in the stator manufacturing method to deform the outer shape of the octagonal coil. To produce the stator, it is necessary that the coil end portion of the first loop is formed with a first protrusion and the coil end portion of the second loop is formed with a second protrusion. With the above configuration, such first protrusion and second protrusion can be easily formed.

The configuration in (12) according to the stator manufacturing apparatus in (11) comprises a fixing mechanism for fixing both ends of the coil formed with the protrusions, a die having a curved surface against which the protrusion-formed coil is pressed in the axial direction, and the protrusion-formed coil is shaped into a curved form.

The use of the die having the curved surface can shape the coil formed with the protrusions into a curved form, thus achieving the third step described in (7).

The configuration in (13) according to the stator manufacturing apparatus in (12) comprises a right holding die and a left holding die for holding the pair of protrusions of the coil shaped into the curved form, and a drive mechanism for displacing the left holding die with respect to the right holding die, and the lane-change portion is foamed in the pair of protrusions of the coil shaped into the curved form.

To stack or overlap the coils each shaped into the curved form, it is necessary to avoid the interference between adjacent coils. The lane change formed in each coil can achieve a stator with short coil ends as in the configuration in (1). Further, by pressure applied by use of the drive mechanism and the right holding die and the left holding die, the lane-change portions can be formed one each in the same positions of the upper coil end and the lower coil end of the coil shaped into the curved form. This configuration can realize the fourth step described in (10).

DETAILED DESCRIPTION

A detailed description of a first preferred embodiment of the present invention will now be given.

First Embodiment

Figure 1:
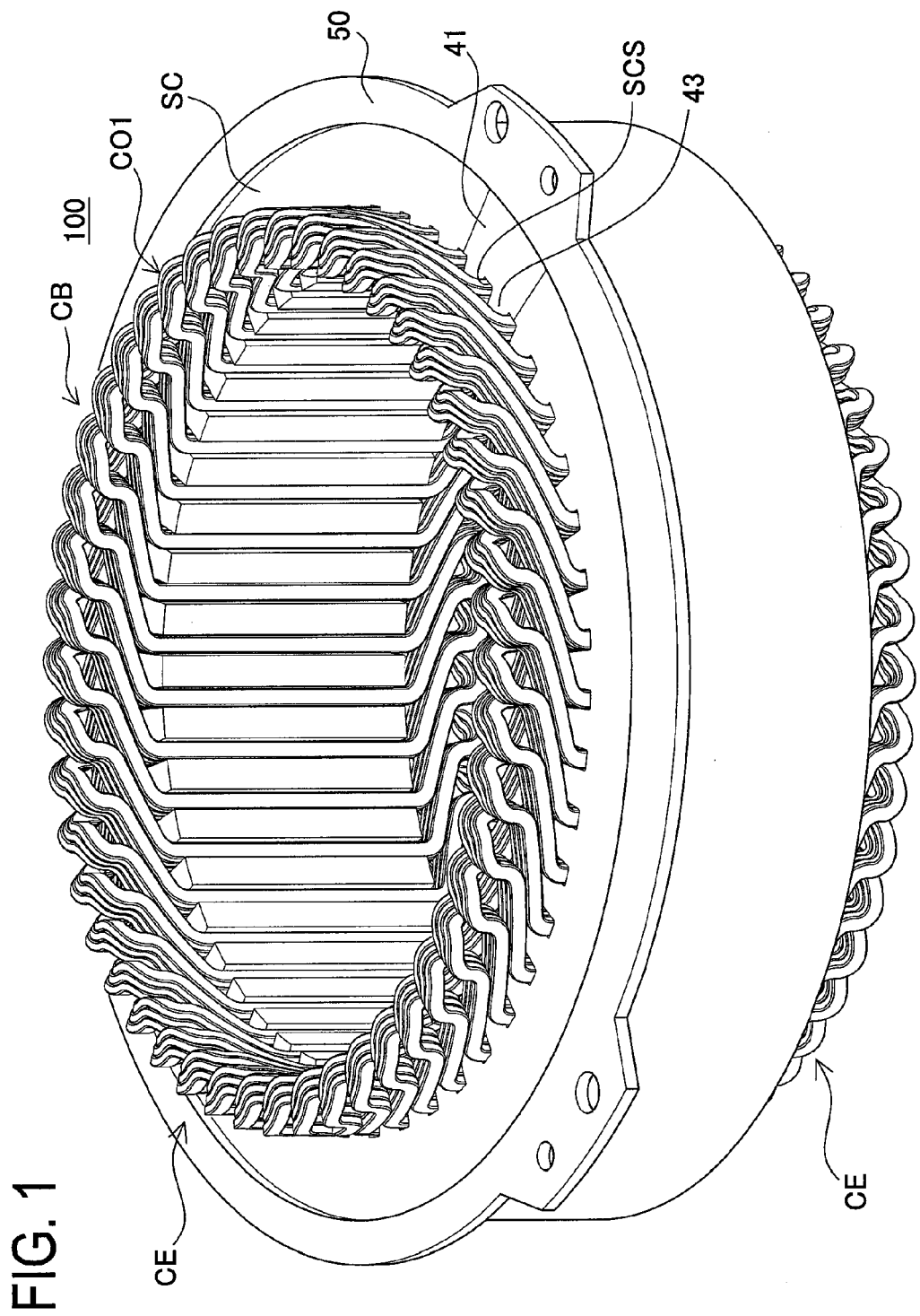
FIG. 1 is a perspective view of a stator in a first embodiment.

FIG. 1 is a perspective view of a stator in the first embodiment.

A stator 100 includes protrusion-formed coils CO1, a split stator core SC, and an outer ring 50. It is to be noted that a terminal stand 55 and bus bars BB shown in FIG. 17 should be provided in a coil end CE to complete the stator 100 but they are not illustrated in FIG. 1 for facilitating the explanation of lane change.

Figure 2:
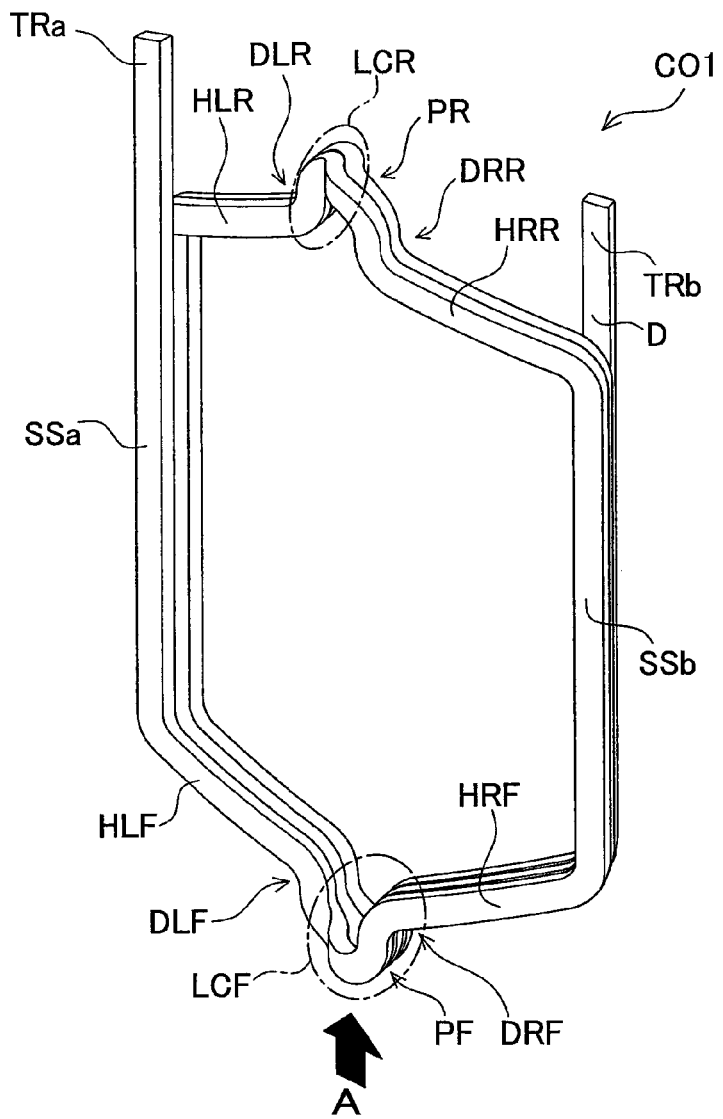
FIG. 2 is a perspective view of a protrusion-formed coil in the first embodiment.
Figure 3:
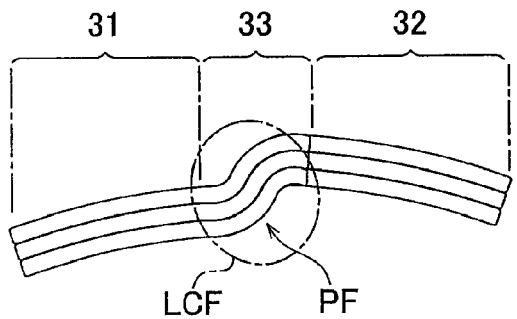
FIG. 3 is a lower view of the protrusion-formed coil in the first embodiment.

FIG. 2 is a perspective view of each protrusion-formed coil. FIG. 3 is a lower view of the protrusion-formed coil, seen from an arrow A in FIG. 2.

The protrusion-formed coil CO1 is made, as shown in FIG. 2, by winding a flat rectangular conductor (conductor wire) D in three turns by edge-wise bending, so that a first terminal portion TRa and a second terminal portion TRb are provided.

The protrusion-formed coil CO1 further includes a first oblique side portion HLR, a second oblique side portion HRR, a third oblique side portion HLF, and a fourth oblique side portion HRF. In respective extensions, a protrusion PR on a lead side (a "lead-side protrusion") and a protrusion PF on an opposite side from the lead side (a "non-lead-side protrusion") are formed. A forming manner of these protrusions PR and PF will be described in detail later. On both sides of the lead-side protrusion PR, a right recess DRR and a left recess DLR are provided. On both sides of the non-lead-side protrusion PF, a right recess DRF and a left recess DLF are provided. Further, the lead-side protrusion PR includes a lead-side lane-change portion LCR and the non-lead-side protrusion PF includes a non-lead-side lane-change portion LCF.

The protrusion-formed coil CO1 is also provided with a first in-slot conductor portion SSa and a second in-slot conductor portion SSb which are to be inserted in slots SCS of the stator core SC.

The split stator core SC consists of twenty-four pieces 41 each of which is made of laminated electromagnetic steel plates and arranged in a cylindrical form. The outer ring 50 is fit on the stator core SC to hold the protrusion-formed coils CO1.

It is to be noted that in FIG. 1, parting lines of the split stator core SC are not illustrated consciously. The stator core SC includes the slots SCS and teeth 43 on the inner periphery side, each piece 41 has a shape divided in the bottoms of the slots SCS so as to include two teeth 43.

The outer ring 50 is made of metal in a cylindrical shape and with such a size that an inner periphery thereof conforms to an outer periphery of the stator core SC. The outer ring 50 is mounted around the stator core SC by shrink fitting. Accordingly, the inner periphery of the outer ring 50 is designed to be slightly smaller than the outer periphery of the stator core SC.

Figure 4:
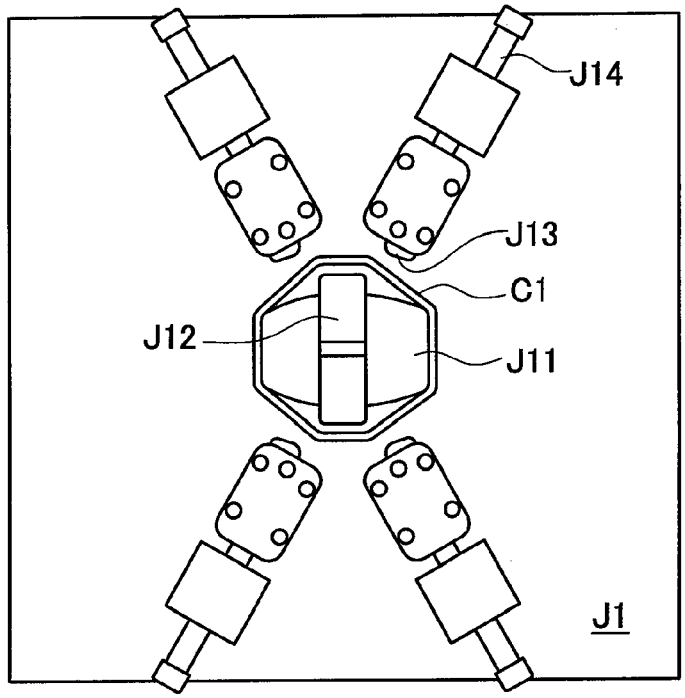
FIG. 4 is an upper view of a jig for forming the protrusion-formed coil in the first embodiment.
Figure 5:
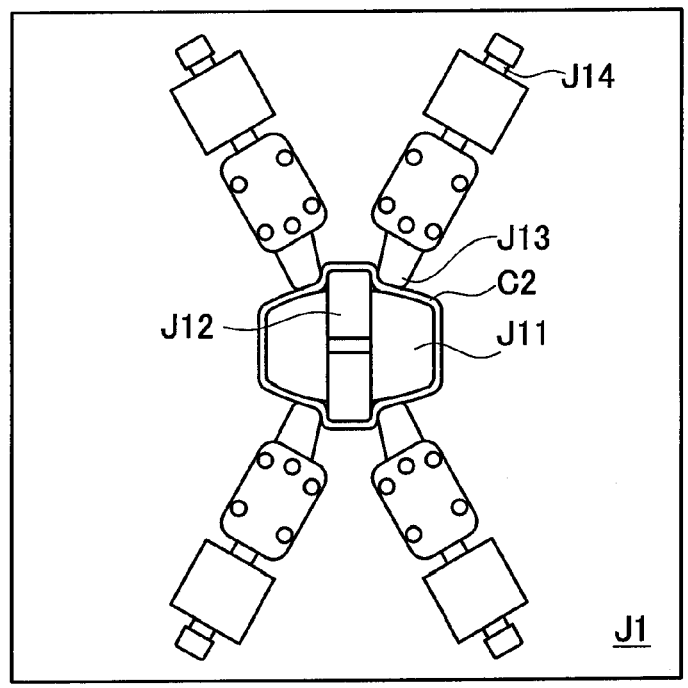
FIG. 5 is an upper view showing a forming state using the coil protrusion forming jig in the first embodiment.

A method of forming the coils in the first embodiment will be explained below. FIG. 4 is a top view of a coil protrusion forming jig. FIG. 5 is a top view showing a forming state using the coil protrusion forming jig.

Firstly, an octagonal initial coil C1 is formed by winding a flat rectangular conductor D by edge-wise bending. The initial coil C1 is set on a center holder J11 of the coil protrusion forming jig J1. The jig J1 corresponds to a coil fixing part. The center holder J11 and a protrusion guide J12 are placed in combination. As shown in FIG. 4, the initial coil C1 is put so at to surround the center holder J11 and the protrusion guide J12.

The coil protrusion forming jig J1 includes press jigs J13 corresponding to a press mechanism to shape the initial coil C1 to have the lead-side right recess DRR and the non-lead-side left recess DLF of the protrusion-formed coil CO1.

While the initial coil C1 is set on the center holder J11 and the protrusion guide J12, a rod J14 of each press jig J13 is moved ahead, thereby forming a recess as shown in FIG. 5. As a result, the initial coil C1 is shaped into a protrusion-including coil C2 formed with the lead-side protrusion PR and the non-lead-side protrusion PF of the protrusion-formed coil CO1.

Figure 6:
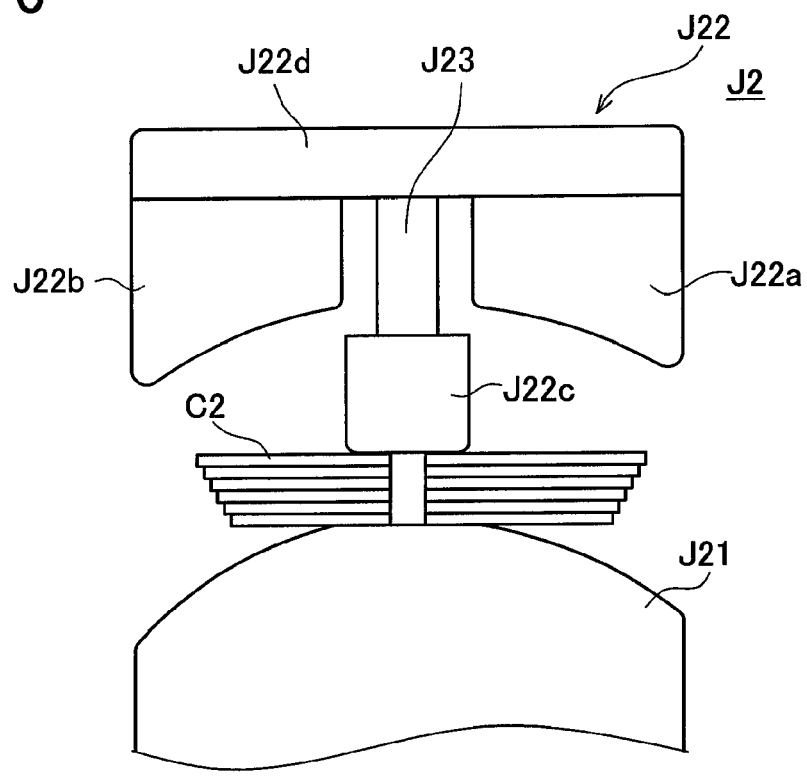
FIG. 6 is a side view of a curve deforming jig in the first embodiment.
Figure 7:
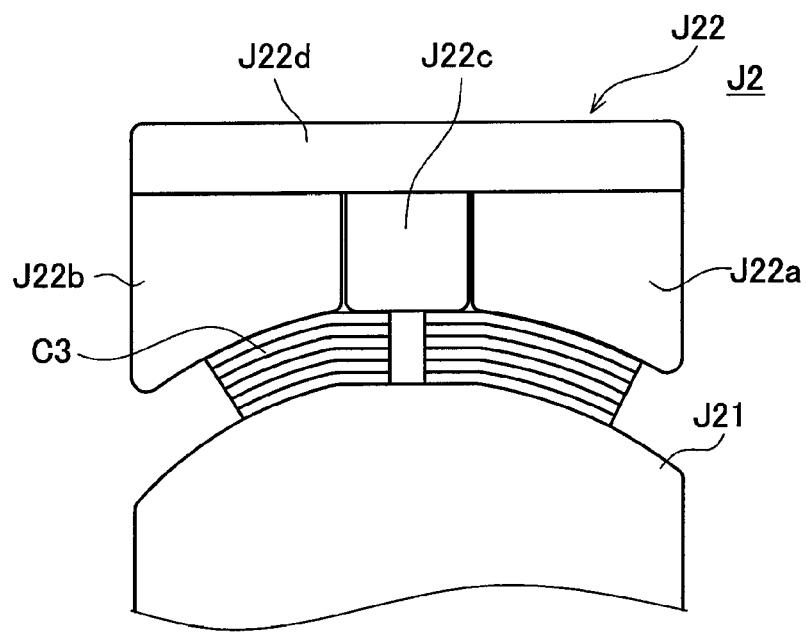
FIG. 7 is a side view showing a coil forming state using the curve deforming jig in the first embodiment.

Successively, the protrusion including coil C2 shaped by forming the protrusions in the initial coil C1 has to be subjected to a step of deforming into a circular arc shape. FIG. 6 is a side view of a curve deforming jig. FIG. 7 shows a state where the coil is shaped by use of the curve deforming jig. A curve deforming jig J2 includes a fixed die J21, a movable die J22, and a shaft J23.

The fixed die J21 has a curved surface necessary to provide a radius curvature required for placement in the stator 100 to the protrusion-formed coil CO1. The movable die J22 also has a similar curved surface and is arranged to be movable along the shaft J23 in a direction toward the fixed die J21.

The movable die J22 includes four components; a center holding member J22c corresponding to a fixing mechanism to press the protrusion including coil C2, a first curve forming die J22a and a second curve forming die J22b for deforming the protrusion including coil C2, and a die base J22d.

The first and second curve forming dies J22a and J22b are equal in radius curvature to the curved surface of the fixed die J21 (strictly speaking, the thickness of the fixed die J21 and a curve including coil C3 corresponds to the radius curvature of the second curve forming die J22b), enabling bending of the protrusion including coil C2.

While the coil C2 is set in the curve deforming jig J2, the coil C2 is held by the center holding member J22c, the first and second curve forming dies J22a and J22b fixed to the die base J22d are given thrust to move together with the die base J22d toward the fixed die J21, thereby deforming the coil C2. As a result, the coil C2 is deformed into a curve including coil C3 as shown in FIG. 7.

Further, an explanation is given to a step of forming, in the coil C3, a lead-side lane-change portion LCR11 and a non-lead-side lane-change portion LCF11 of a first loop coil 10 and a lead-side lane-change portion LCR12 and a non-lead-side lane-change portion LCF 12 of a second loop coil 20.

Figure 8:
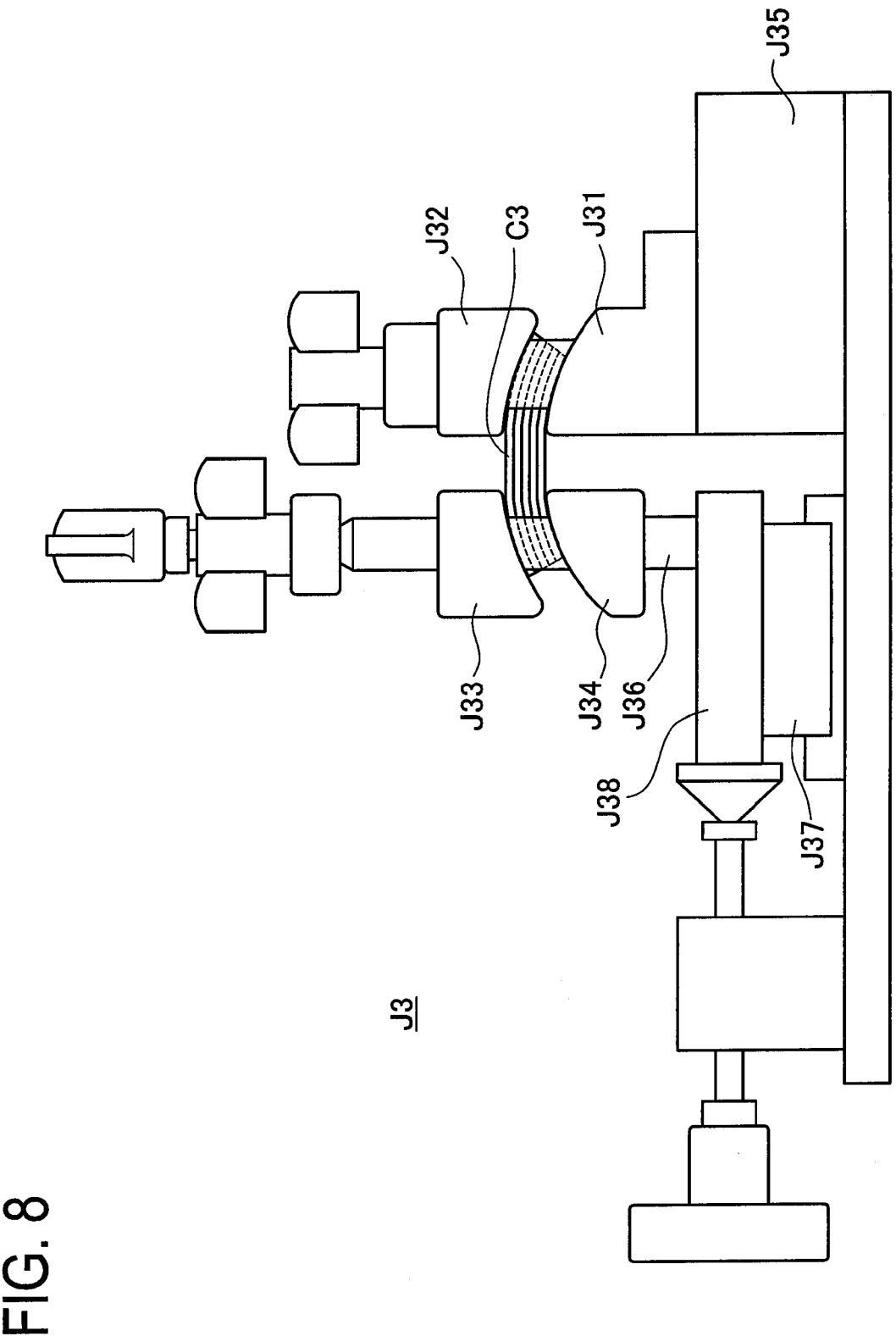
FIG. 8 is a side view related to a lane-change forming jig in the first embodiment.
Figure 9:
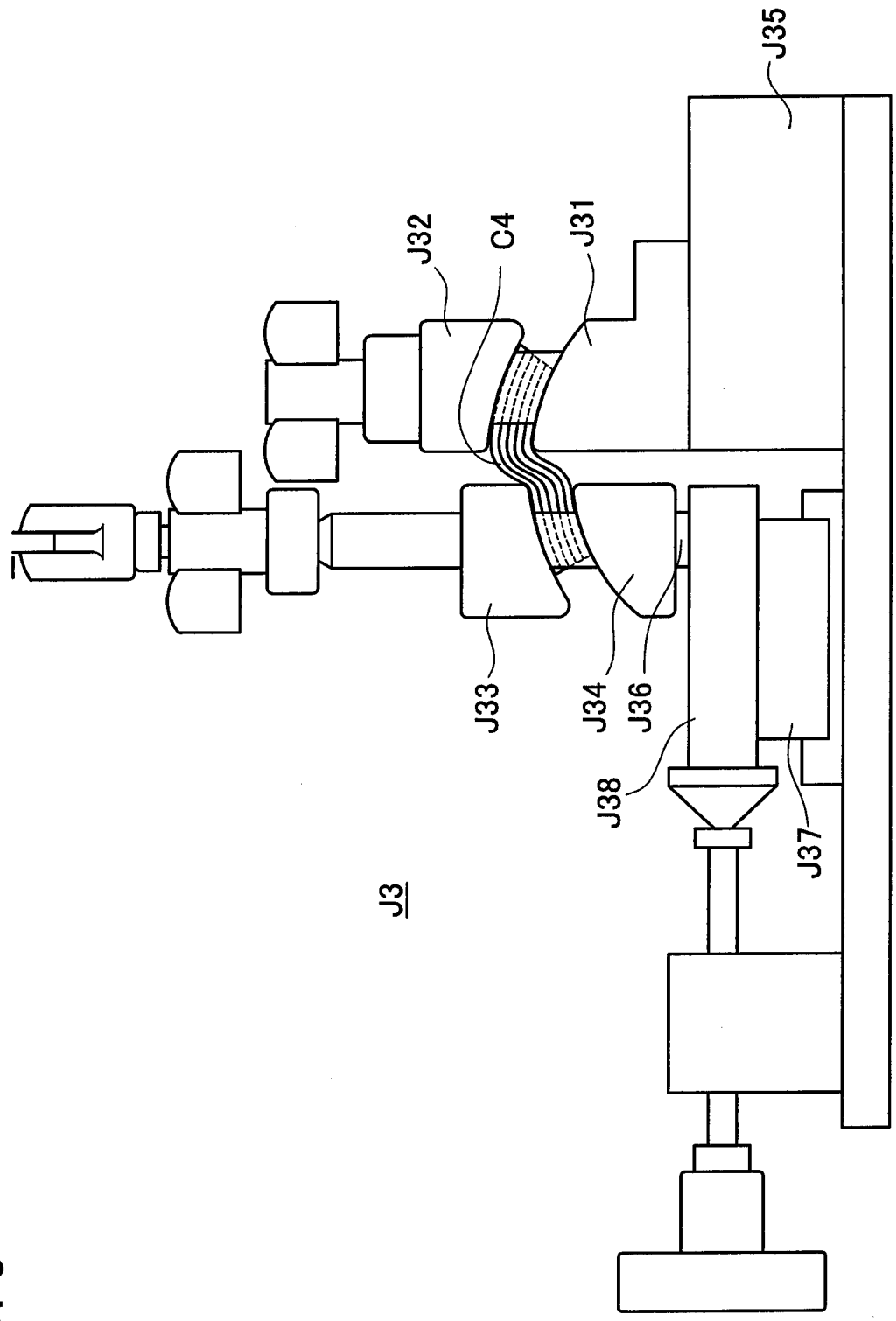
FIG. 9 is a side view showing a state of a coil formed with a lane-change portion by use of the lane-change forming jig in the first embodiment.

FIG. 8 is a side view related to a lane-change forming jig. FIG. 9 is a side view showing a state where the lane change portion is formed in the coil by the lane-change forming jig.

A lane-change forming jig J3 includes a fixed base J31, a fixed chuck J32, a movable chuck J33, and a movable base J34. The fixed base J31 is placed on a base J35. The fixed base J31 and the fixed chuck J32 movable in a direction that approaches the fixed base J31 hold one end of the curve including coil C3.

The movable chuck J33 and the movable base J34 are held on a slide base J38 by a shaft 36 passing therethrough. The slide base J38 fixed to a slide guide J37 has a drive mechanism to be movable rightward and leftward in FIG. 8 relative to the fixed base J31. The movable chuck J33 and the movable base J34 have a drive mechanism to be movable upward and downward in FIG. 8 relative to the slide base J38. The movable chuck J33 and the movable base J34 are also arranged to hold the other end of the curve including coil C3.

The curve including coil C3 is held in such a state as shown in FIG. 8 by the lane-change forming jig J3. When the slide base J38 is moved ahead and simultaneously the movable chuck J33 and the movable base J34 clamping the other end of the coil C3 are moved down, a lane-change including coil C4 is formed as shown in FIG. 9.

This coil C4 is the protrusion-formed coil CO1 shown in FIG. 2 and in a state where it can be installed in the split stator core SC.

The protrusion-formed coil CO1 includes three zones as shown in FIG. 3, that is, an inner-circumferential zone 31, an outer-circumferential zone 32, and a protruding lane-change zone 33. The lane-change zone 33 is defined as a generic term of a range corresponding to the lead-side lane-change portion LCR of the lead-side protrusion PR or the non-lead-side lane-change portion LCF of the non-lead-side protrusion PF in the protrusion-formed coil CO1.

After the coils CO1 are stacked or overlapped in a cage form, completing the cage coil CB, the split stator core SC is inserted therein.

A process of forming the cage coil CB will be mentioned in detail in a forth embodiment and thus is omitted here.

After the cage coil CB is formed and the stator core SC is inserted therein, the outer ring 50 is finally shrink-fitted on the outer periphery of the stator core SC as shown in FIG. 1. Thus, the stator 100 is completed.

Figure 10:
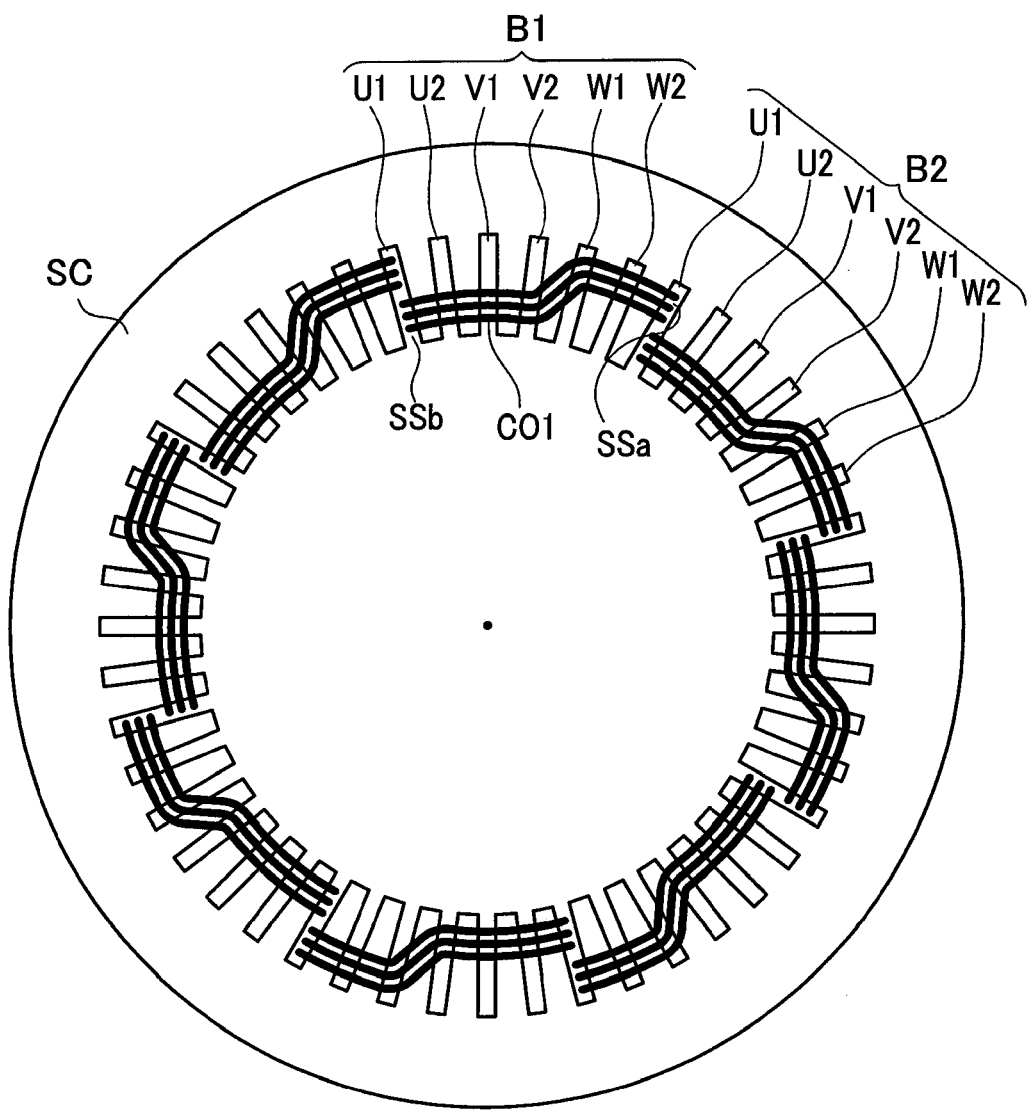
FIG. 10 is a schematic plan view showing U-phase coils provided in a stator core in the first embodiment.

FIG. 10 is a schematic plan view of U-phase coils formed in the stator core. Assuming a U phase, a V phase, and a W phase are referred to as one block, the stator 100 consists of eight blocks. A first block B1 includes six slots, i.e., a U-phase first slot U1B1, a U-phase second slot U2B1, a V-phase first slot V1B1, a V-phase second slot V2B1, a W-phase first slot W1B1, and a W-phase second slot W2B1.

The second block B2 includes six slots, i.e., a U-phase first slot U1B2, a U-phase second slot U2B2, a V-phase first slot V1B2, a V-phase second slot V2B2, a W-phase first slot W1B2, and a W-phase second slot W2B2.

In each protrusion-formed coil CO1, as shown in FIG. 10, the second in-slot conductor portion SSb is inserted in the U-phase first slot U1B1 and the first in-slot conductor portion SSa is inserted in the U-phase first slot U1B2. In other words, the second in-slot conductor portion SSb is inserted on the inner circumferential side of one slot SCS and the first in-slot conductor portion SSa is inserted on the outer circumferential side of the same slot SCS.

The details of formation of the lead-side protrusion PR and the non-lead-side protrusion PF of the protrusion-formed coil CO1 will be explained below.

Figure 29:
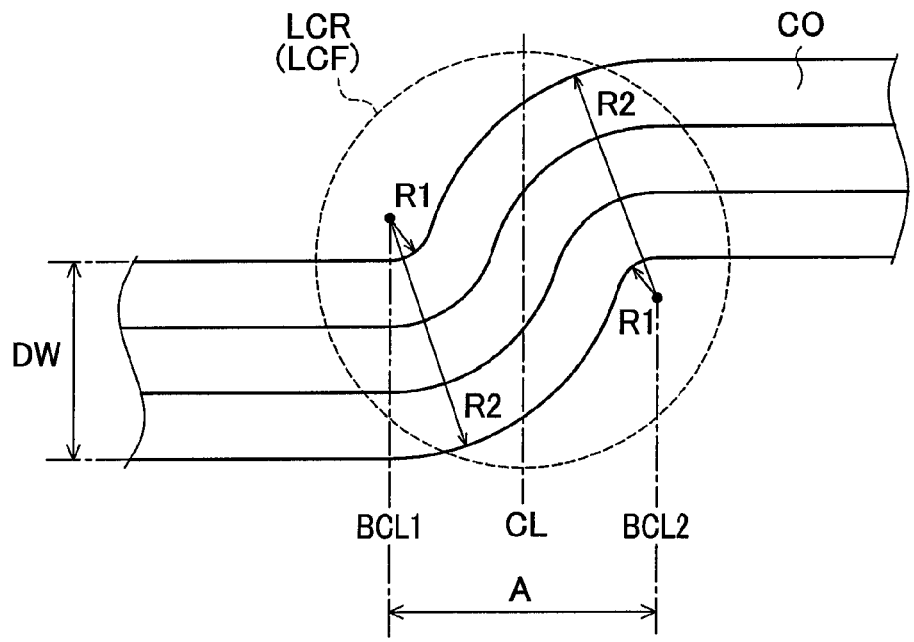
FIG. 29 is a schematic top view showing a state of a lane-change portion of a coil bundle assumed for comparison with the first embodiment.
Figure 30:
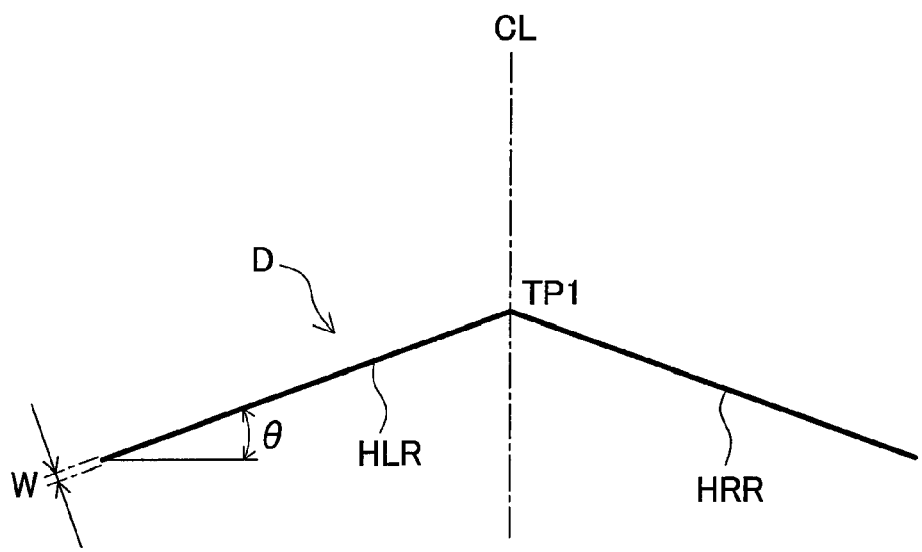
FIG. 30 is a side linear diagram of the coil bundle assumed for comparison with the first embodiment.

FIG. 29 is a schematic view showing a state of a lane-change portion of a coil bundle. The coil bundle arranged in a cylindrical form is schematically illustrated in a linear pattern for convenience of explanation. FIG. 30 is a side linear diagram of the coil bundle, but shows the coil CO in a simplified diagram for facilitating the explanation.

The coil CO is assumed to have no lead-side protrusion PR and the non-lead-side protrusion PF in a coil end CE of the protrusion-formed coil CO1. The coil CO is a coil made of a flat rectangular conductor (conductor wire) D wound in three turns, similar to the protrusion-formed coil CO1. A portion of a lead-side lane-change portion LCR of this coil CO is shown in FIG. 29.

In three parts of the flat rectangular conductor D arranged side by side, the lead-side lane-change portion LCR is formed. This coil CO has a width defined by a conductor bundle thickness DW. Assuming that the inside radius of a bending portion is inside bending radius R1, the distance between the centers of right and left bending radii R1 is represented as an inflection-point distance A. Further, the outside radius of the bending portion is assumed as outside bending radius R2. The lead-side lane-change portion LCR is therefore formed in a range of the inflection-point distance A which is the distance between the centers of the bending portions, i.e., a first bending center BCL1 and a second bending center BCL2 as shown in FIG. 29. In effect, the inflection-point distance A is a distance in a circumferential distance of the stator and thus it is not a linear distance. However, it will be explained as a linear distance because it is illustrated in the linear pattern in FIG. 29.

As shown in FIG. 30, the side surface of the coil CO consists of the first oblique side portion HLR and the second oblique side portion HRR without including the lead-side protrusion PR or the non-lead-side protrusion PF. Although the conductor thickness W needs a predetermined thickness under normal conditions, the conductor thickness W is illustrated as zero in FIG. 30 for convenience of explanation. An angle θ of the first oblique side portion HLR and that of the second oblique side portion HRR are determined by the conductor thickness W and a pitch between the slots SCS.

Figure 31:
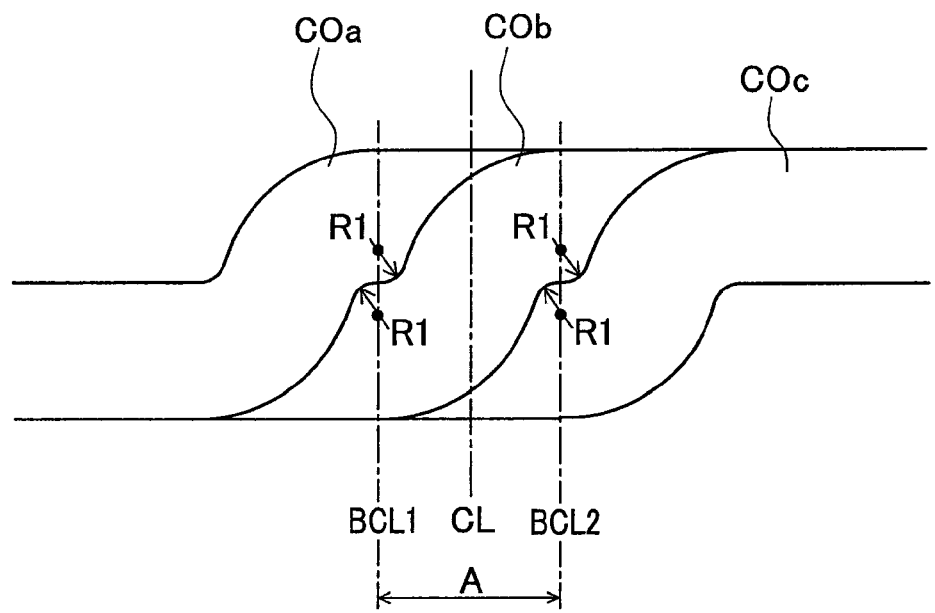
FIG. 31 is a schematic top view of the stacked coil bundle assumed for comparison with the first embodiment.
Figure 32:
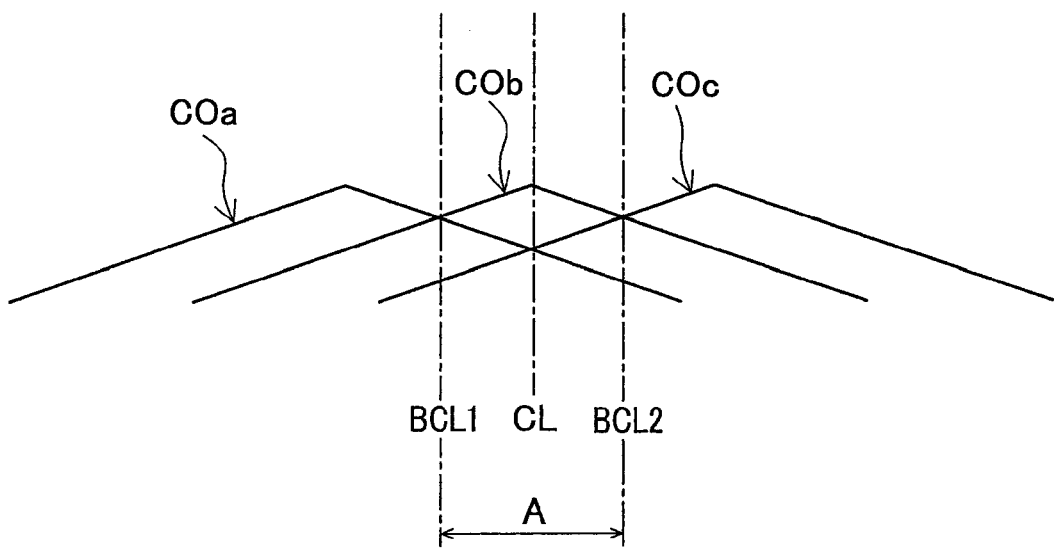
FIG. 32 is a side linear diagram of the stacked coil assumed for comparison with the first embodiment.

FIG. 31 is a schematic top view of the stacked coil bundle. The lines between of the conductors are omitted. The coil bundle arranged in a cylindrical form is schematically shown in a linear pattern for convenience of explanation. FIG. 32 is a side linear diagram of stacked coils. However, a first coil COa to a third coil COc are illustrated in a simplified diagram for explanation.

In FIG. 31, the first coil COa, the second coil COb, and the third coil COc are stacked. The center of the inside bending radius R1 of the first coil COa and the center of the inside bending radius R1 of the second coil COb are on a first bending center line BCL1. The center of the inside bending radius R1 of the second coil COb and the center of the inside bending radius R1 of the third coil COc are on a second bending center line BCL2.

A side view of the above coils is shown in FIG. 32. In FIG. 32, as in FIG. 30, the conductor thickness W is illustrated as zero. If the conductor thickness W is zero, the first coil COa to the third coil COc are allowed to be arranged closely. However, the conductor thickness is actually not zero and the first coil COa, the second coil COb, and the third coil COc cannot be arranged as in FIG. 31.

Figure 33:
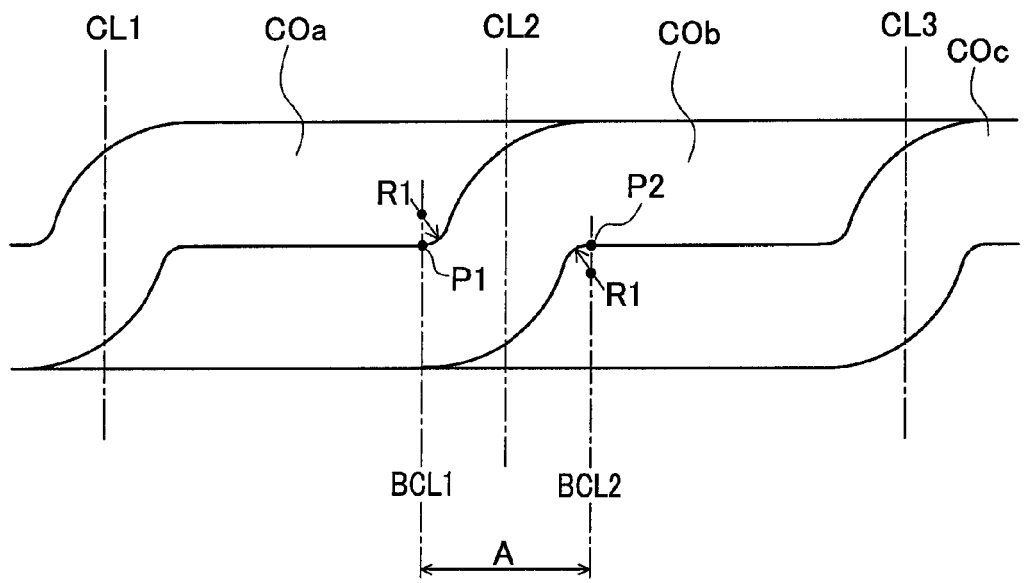
FIG. 33 is a schematic top view of a thick coil bundle assumed for comparison with the first embodiment.
Figure 34:
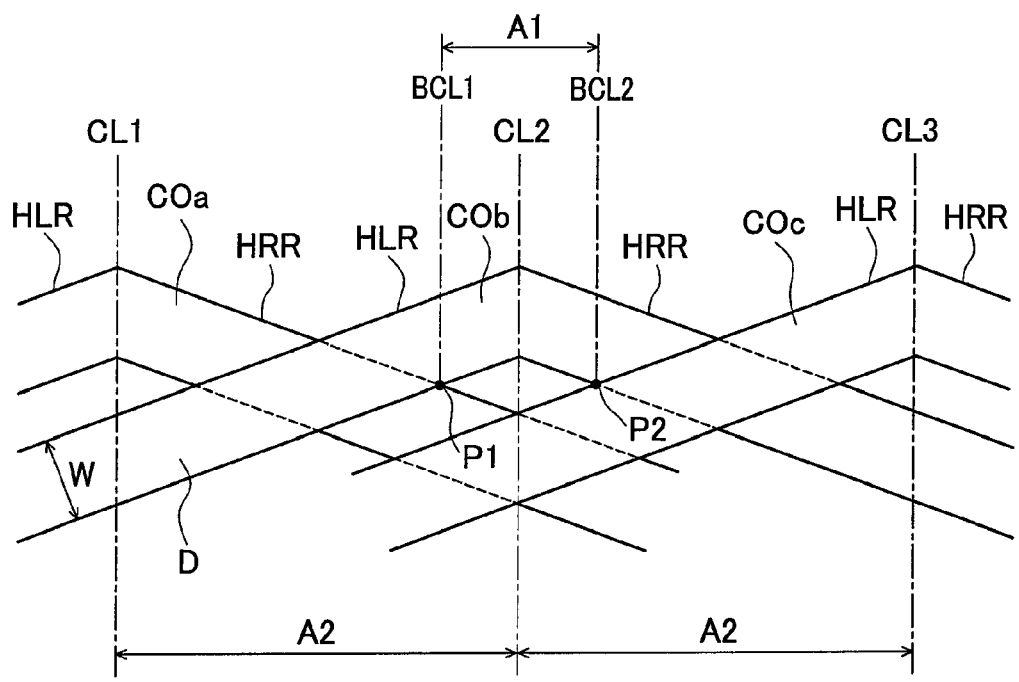
FIG. 34 is a side view of the stacked thick coil bundle assumed for comparison with the first embodiment.

FIG. 33 is a schematic top view of the stacked thick coil bundle, corresponding to FIG. 31. FIG. 34 is a side view of the stacked thick coil bundle, but illustrated in a simplified diagram.

Since the conductor thickness W of the coil CO is not zero, the coils CO are actually arranged as shown in FIGS. 33 and 34. To avoid the interference between the flat rectangular conductors D, the first coil COa and the second coil COb have to be placed so that a coil interference-point distance A1 is equal to or longer than the inflection-point distance A explained in FIG. 29. At that time, an intersection point between the outer circumferential side of the second oblique side portion HRR of the first coil COa and the inner circumferential side of the first oblique side portion HLR of the second coil COb is referred to as a first intersection point P1.

To avoid the interference between the flat rectangular conductors D, the second coil COb and the third coil COc have to be placed so that the coil interference-point distance A1 is equal to or longer than the inflection-point A. At that time, an intersection point between the outer circumferential side of the second oblique side portion HRR of the second coil COb and the inner circumferential side of the first oblique side portion HLR of the third coil COc is referred to as a second intersection point P2.

If the coil interference-point distance A1 between the first intersection point P1 and the second intersection point P2 is not equal to or longer than the inflection-point distance A, the second coil COb cannot be placed between the first coil COa and the third coil COc. Accordingly, as shown in FIG. 33, the positional interval between the first coil COa to the third coil COc is elongated, a pitch corresponding to a coil center-to-center distance A2 is needed. As a result, it is also necessary to increase a pitch of the slots SCS of the split stator core SC. This disturbs the development of high power of the motor using the stator 100.

Figure 35:
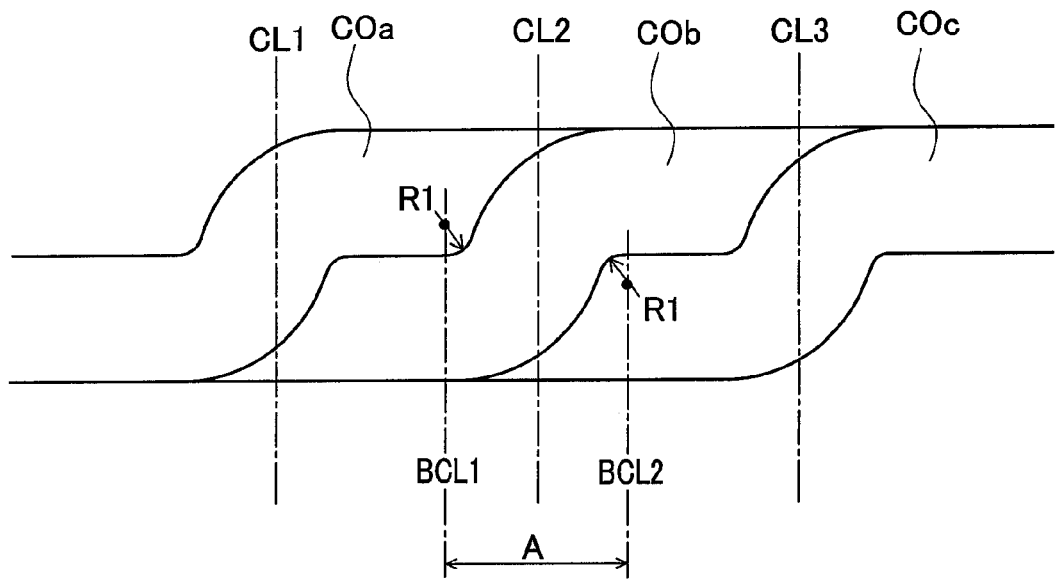
FIG. 35 is a top view of the stacked protrusion-formed coils in the first embodiment.

FIG. 35 is a top view of the stacked protrusion-formed coils. The lines between the conductors are omitted. The coil bundle arranged in a cylindrical form is schematically illustrated in a linear pattern for convenience of explanation.

Figure 36:
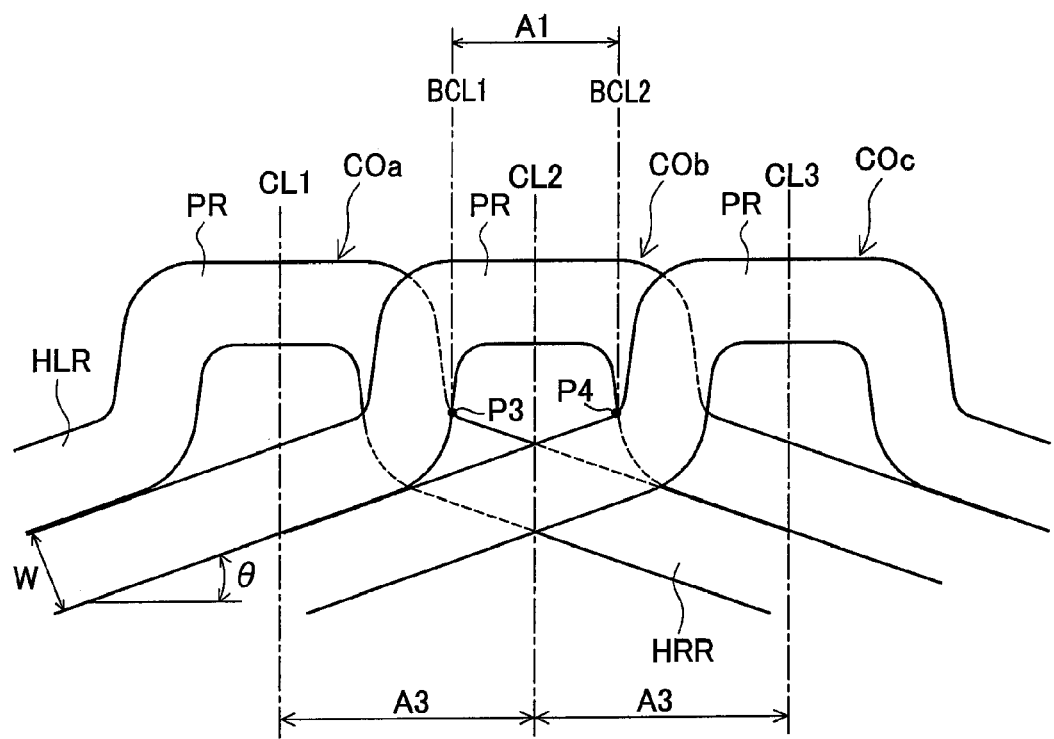
FIG. 36 is a side view of the stacked protrusion-formed coils in the first embodiment.

FIG. 36 is a side view of the stacked protrusion-formed coils.

As the coil CO, the protrusion-formed coil CO1 formed with the lead-side protrusion PR and the non-lead-side protrusion PF is used. In the protrusion-formed coil CO1, the flat rectangular conductor D is bent upward from a portion of the first oblique side portion HLR to form the lead-side protrusion PR. Further, the flat rectangular conductor D is bent downward from a portion of the lead-side protrusion PR to be continuous with the second oblique side portion HRR. As above, the lead-side protrusions PR are formed in the coil end CE (the non-lead-side protrusion PF is similarly formed), so that the first coil COa, the second coil COb, and the third coil COc can be arranged as shown in FIG. 35 at a short coil center-to-center distance A3 shorter than the coil center-to-center distance A2. Depending on the size of the flat rectangular conductor D used for the coil CO, the distance A3 can be determined to be about 70% of the distance A2 in a case assumed by the present applicant.

The rising height of the lead-side protrusion PR (or the non-lead-side protrusion PF) has to be determined so that the range of the coil interference-point distance A1 is equal to or shorter than the inflection-point distance A. The rising height is determined in relation to the angle θ, the conductor thickness W, and the conductor bundle thickness DW.

If the condition that the inside bending radius R1 of the first coil COa and the inside bending radius R1 of the second coil COb are positioned on the first bending center line BCL1 is not added, the coil interference-point distance A1 may be conceptually set to be equal to or shorter than the inflection-point distance A.

The above numerical values are determined by design requirements.

The inflection-point distance A is a size needed for lane change of the protrusion-formed coil CO1. When this coil CO1 is to be formed with the lead-side protrusion PR and the non-lead-side protrusion PF, it has to be designed so that the coil interference-point distance A1 between the adjacent coils CO1, for example, the first coil COa and the second coil COb, is almost equal to the inflection-point distance A which is a distance between the center points of the inside bending radius R1. It is to be noted that the inflection-point distance A may be slightly shortened as mentioned above if the condition is not added that the inside bending radius R1 of the first coil COa and the inside bending radius R1 of the second coil COb are located on the first bending center line BCL1.

The stator 100 in the first embodiment is configured as above and therefore can exhibit the following operations and advantages. Firstly, the stator 100 in the first embodiment can have a short coil end CE. The stator 100 in the first embodiment includes the split stator core SC including the teeth 43 and the slots SCS formed between the teeth 43, and the protrusion-formed coils CO1 made of the flat rectangular conductors D and placed in the slots SCS. Each protrusion-formed coil CO1 is formed, in the coil end CE, with the first oblique side portion HLR, the second oblique side portion HRR, the third oblique side portion HLF, the fourth oblique side portion HRF, and the lead-side protrusion PR or the non-lead-side protrusion PF formed to protrude upward in an axial direction of the stator core SC from the first oblique side portion HLR, the second oblique side portion HRR, the third oblique side portion HLF, and the fourth oblique side portion HRF. The lead-side protrusion PR or the non-lead-side protrusion PF is designed with a height to avoid the interference with other protrusion-formed coils CO1 when the relevant protrusion-formed coil CO1 is placed in the stator core SC.

The first oblique side portion HLR and the second oblique side portion HRR are formed in the coil end CE of the protrusion-formed coil CO1. At their ends, the lead-side protrusion PR is formed. Further, the third oblique side portion HLF and the fourth oblique side portion HRF are formed on an opposite side from the lead side and, at their ends, the non-lead-side protrusion PF is formed. Accordingly, it is possible to avoid the interference in the coil end CE when the protrusion-formed coils CO1 are stacked. Thus, shortening of the coil end CE can be achieved.

Figure 11:
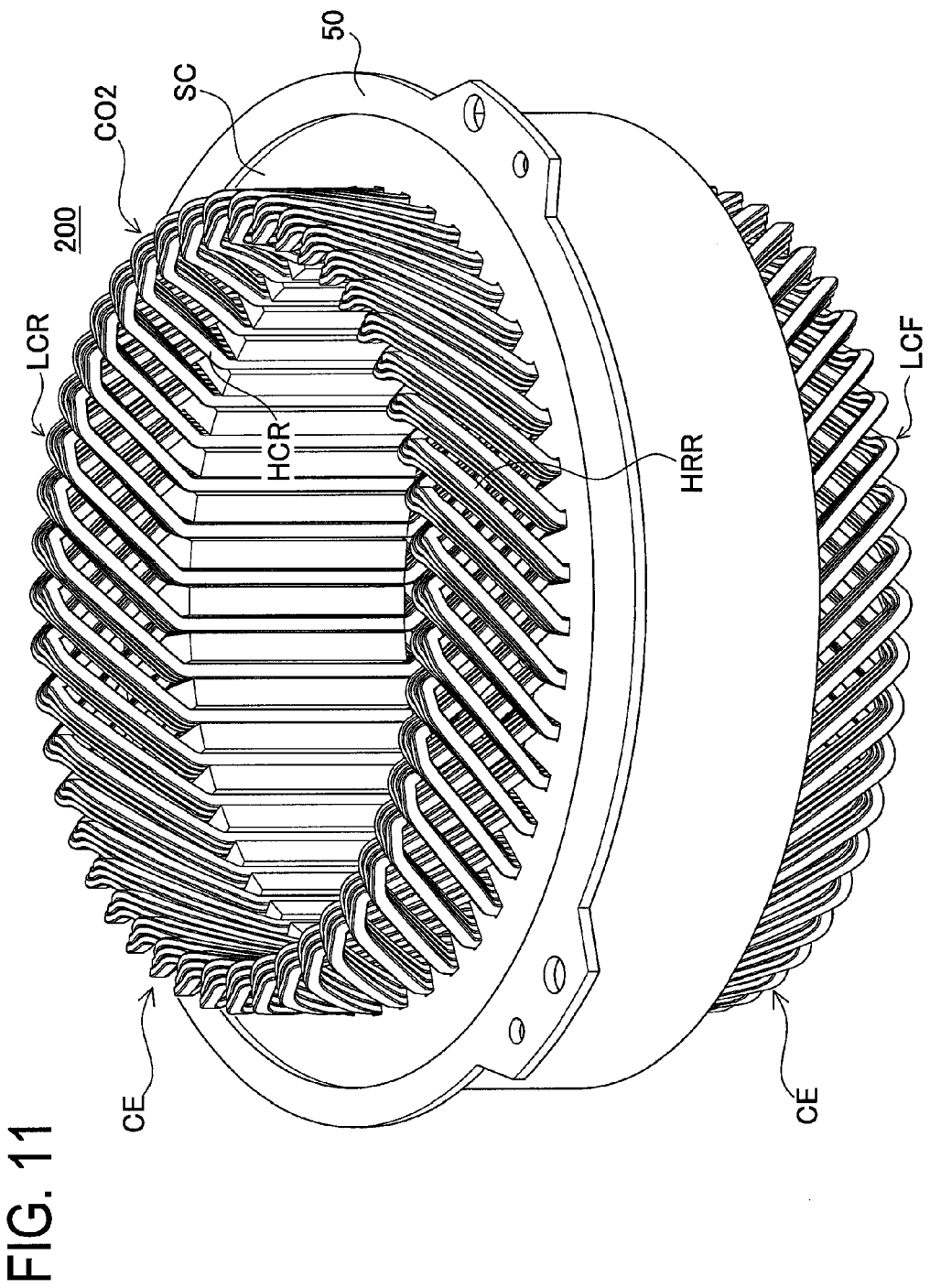
FIG. 11 is a perspective view of a stator arranged to avoid interference between coils without providing a protrusion.

FIG. 11 is a perspective view of a stator configured to avoid the interference between coils without forming the protrusions.

A stator 200 with no protrusion is designed with angles of a first oblique side portion HLR, a second oblique side portion HRR, a third oblique side portion HLF, and a fourth oblique side portion HRF determined so that coils with no protrusion (protrusion-free coils) CO2 do not interfere with each other in a coil end CE.

Therefore, this coil end CE is longer than that in the stator 100 in FIG. 1 using the protrusion-formed coils CO1.

In the case of adopting the shape of the protrusion-free coil CO2, the coil end CE has to be longer to avoid the interference between adjacent coils CO2 according to the intervals between slots SCS in a split stator core SC, the thickness of a flat rectangular conductor D, or the diameter, of the stator core SC.

This is because the design freedom of the coil end CE is low if it is formed of only oblique side portions like the first oblique side portion HLR, the second oblique side portion HRR, the third oblique side portion HLF, and the fourth oblique side portion HRF. Therefore, the protrusion-free coil CO2 has to be formed with an acute angle between the first oblique side portion HLR and the second oblique side portion HRR and an acute angle between the third oblique side portion HLF and the fourth oblique side portion HRF so that the first oblique side portion HLR, the second oblique side portion HRR, the third oblique side portion HLF, and the fourth oblique side portion HRF make a sharp angle with the end face of the stator core SC.

In contrast, if the coil end CE is to be shortened as with the protrusion-free coil CO2 without the lead-side protrusion PR and the non-lead-side protrusion PF, it is necessary to widen pitches between the slots SCS and increasing the diameter of the stator core SC as shown in FIGS. 33 and 34 or reduce the number of slots SCS to ensure the pitches.

On the other hand, when the lead-side protrusion PR is formed to protrude from the first oblique side portion HLR and the second oblique side portion HRR and the non-lead-side protrusion PF is formed to protrude from the third oblique side portion HLF and the fourth oblique side portion HRF, the adjacent protrusion-formed coils CO1 are prevented from interfering with each other three-dimensionally, thereby enabling effective utilization of the space.

In other words, the formation of the lead-side protrusion PR and the non-lead-side protrusion PF in the protrusion-formed coil CO1 enables reducing the diameter of the stator core SC and narrowing the pitches of the slots SCS. Accordingly, this configuration can contribute to shortening of the coil end CE.

The concrete sizes of the lead-side protrusion PR and the non-lead-side protrusion PF are as mentioned above.

A second embodiment of the present invention will be explained below.

Second Embodiment

A stator 100 in the second embodiment is almost the same in structure as the stator 100 in the first embodiment, excepting that a one-side protrusion-formed coil CO3 in the second embodiment corresponding to the protrusion-formed coil CO1 in the first embodiment is slightly different in structure of a coil end CE from the protrusion-formed coil CO1.

Figure 12:
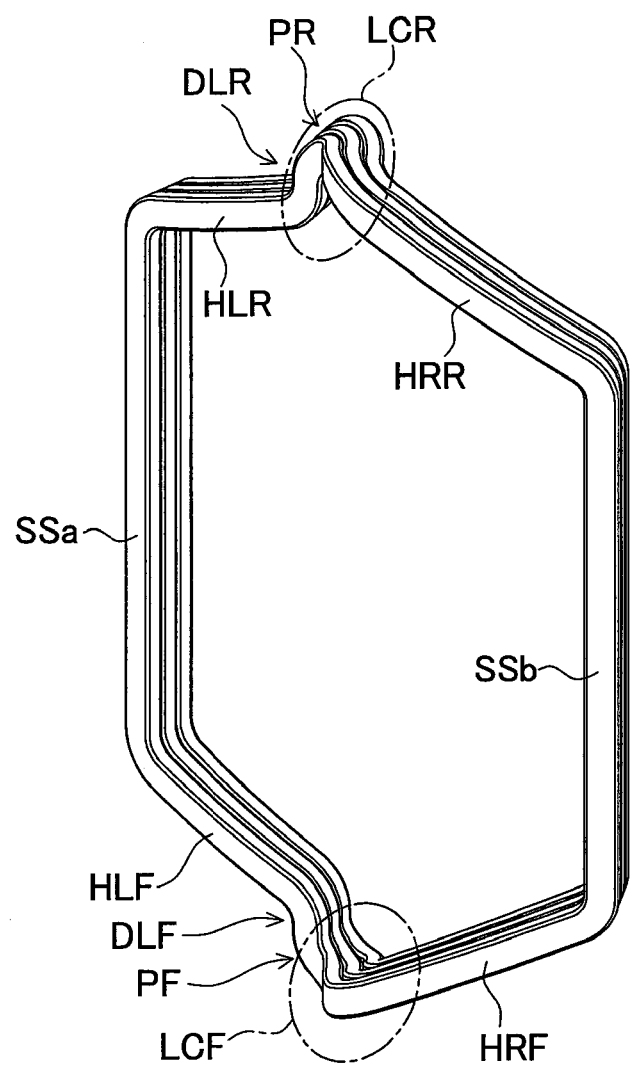
FIG. 12 is a perspective view of a one-side protrusion-formed coil in a second embodiment.

FIG. 12 is a perspective view of the one-side protrusion-formed coil in the second embodiment.

The one-side protrusion-formed coil CO3 includes, as shown in FIG. 12, a first oblique side portion HLR, a second oblique side portion. HRR, a third oblique side portion HLF, and a fourth oblique side portion HRF. A lead-side protrusion PR is formed in an extension of the first oblique side portion HLR. The second oblique side portion HRR is formed linearly to a lead-side lane-change portion LCR. A non-lead-side protrusion PF is formed in an extension of the third oblique side portion HLF. The fourth oblique side portion HRF is formed linearly to a non-lead-side lane-change portion LCF.

Specifically, the one-side protrusion-formed coil CO3 is formed with the lead-side protrusion PR and the non-lead-side protrusion PF in only one sides of the oblique side portions. Thus, a lead-side left recess DLR and a non-lead-side left recess DLF are formed, whereas the lead-side right recess DRR and the non-lead-side right recess DRF provided in the first embodiment are not formed. Accordingly, a coil protrusion forming jig J1 in the second embodiment is identical in fundamental structure to in the first embodiment, excepting that the second embodiment needs to change the placement and the number of press jigs 13. However, a basic forming process is substantially the same as above and is not explained again herein.

Figure 13:
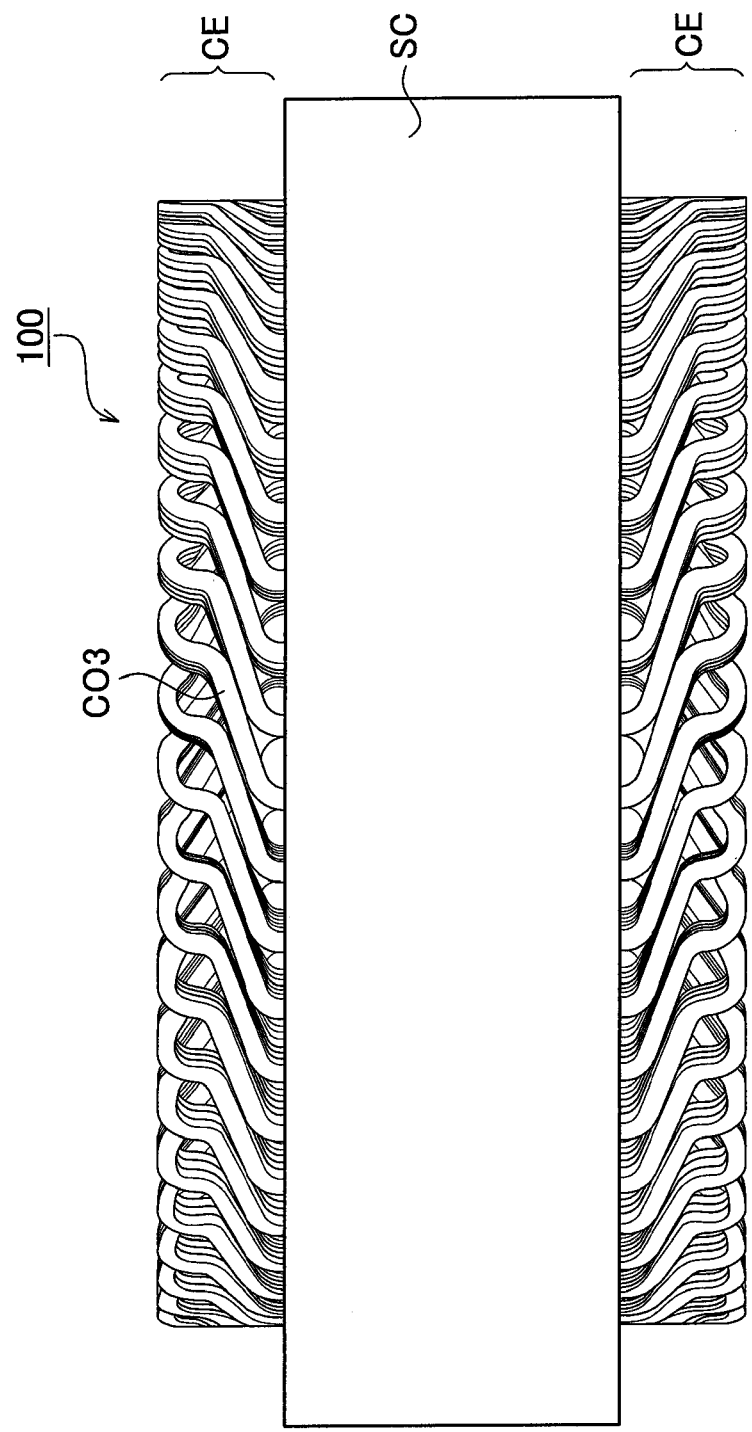
FIG. 13 is a side view of a stator using the one-side protrusion-formed coil in the second embodiment.
Figure 14:
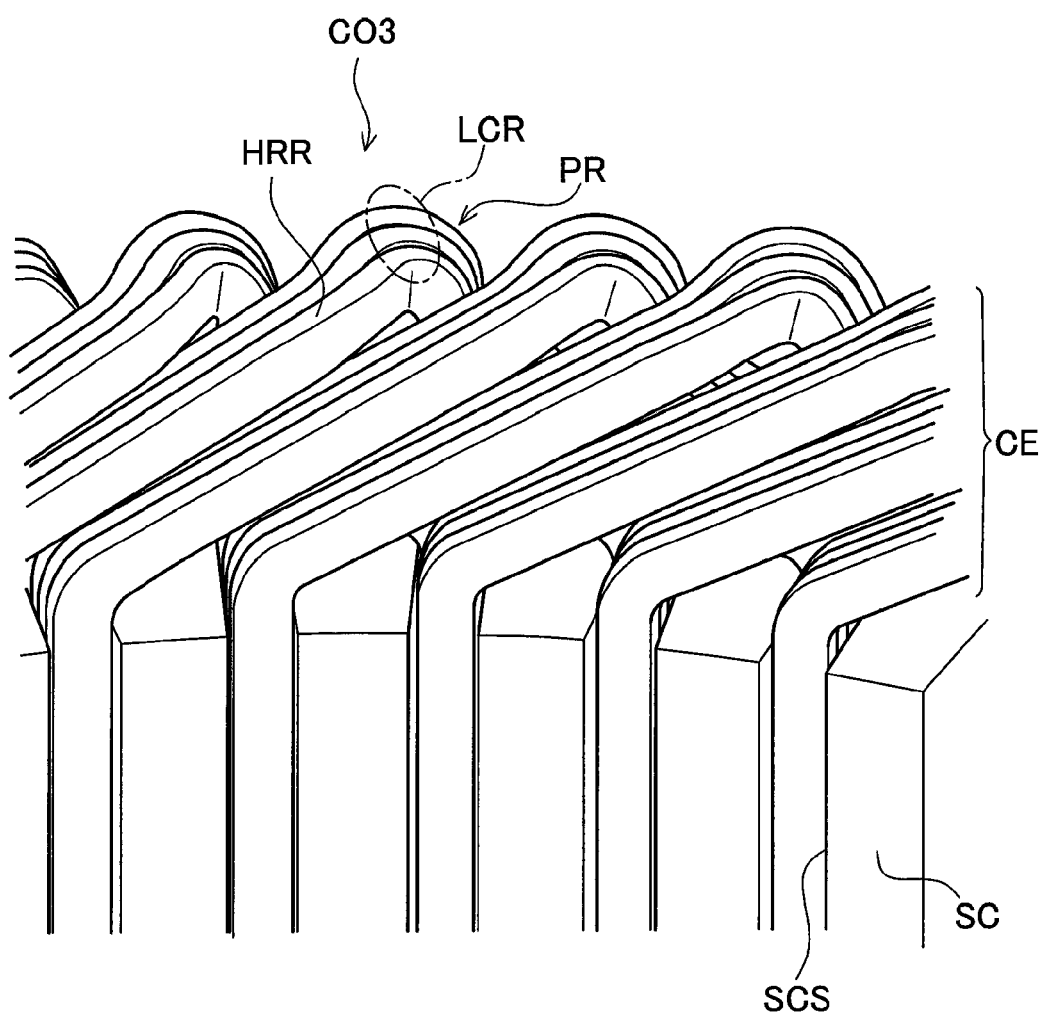
FIG. 14 is a partial perspective view of the stator using the one-side protrusion-formed coil in the second embodiment.

FIG. 13 is a side view of a stator using the one-side protrusion-formed coils. A first terminal portion TRa and a second terminal portion TRb are omitted for convenience of explanation. FIG. 14 is a partial perspective view of the conductor using the one-side protrusion-formed coils.

The lead-side protrusions PR and the non-lead-side protrusions PF formed in the one-side protrusion-formed coils CO3 operate substantially similarly to those in the first embodiment. Accordingly, the same advantages are obtained. Thus, the non-lead-side protrusions PF formed in the coil CO3 can achieve shortening of the coil end CE.

FIG. 13 is a side view of the stator 100 seen from outside. On the other hand, FIG. 14 is a perspective view showing the inside of the stator 100. When the coils CO3 are assembled into a cage coil CB and combined with a split stator core SC. Thus, when seen from the inner circumferential side of the cage coil CB, the second oblique side portions HRR appear as being stacked one on another. When seen from the outer circumferential side of the cage coil CB, the lead-side protrusions PR appear as being arranged side by side. The same state applies to the non-lead-side protrusions PF.

In practice, the first terminal portion TRa and the second terminal portion TRb are formed, even though no explanation is given thereto. Accordingly, the stator 100 has to be subjected to a process of electrically connecting the terminal portions with bus bars BB.

Since the stator 100 is configured as above, the adjacent coils CO3 can detour around each other in three dimensions.

However, the design freedom is lower than the case of using the protrusion-formed coil CO1 in the first embodiment. Thus, the coil end CE may not be so shortened as in the stator 100 in the first embodiment. The present applicant confirmed that, in comparison using the identical split stator cores SC, the coil end CE of the stator 100 in the first embodiment is shorter about 5% than the coil end CE of the stator 100 in the second embodiment.

However, the shortening effect is different according to the pitches and the number of slots SCS of the stator core SC and the thickness of the flat rectangular conductor D. It is therefore necessary to choose either the structure of the first embodiment or the structure of the second embodiment according to the design requirements. Basically, as the pitch is wider, the shortening effect tends to be lower.

A third embodiment of the present invention will be explained below.

Third Embodiment

A stator 100 in the third embodiment is substantially identical in structure to the stator 100 in the second embodiment, excepting that a one-side protrusion-formed coil CO4 in the third embodiment corresponding to the one-side protrusion-formed coil CO3 is slightly different in structure of a coil end CE from the coil CO3.

Figure 15:
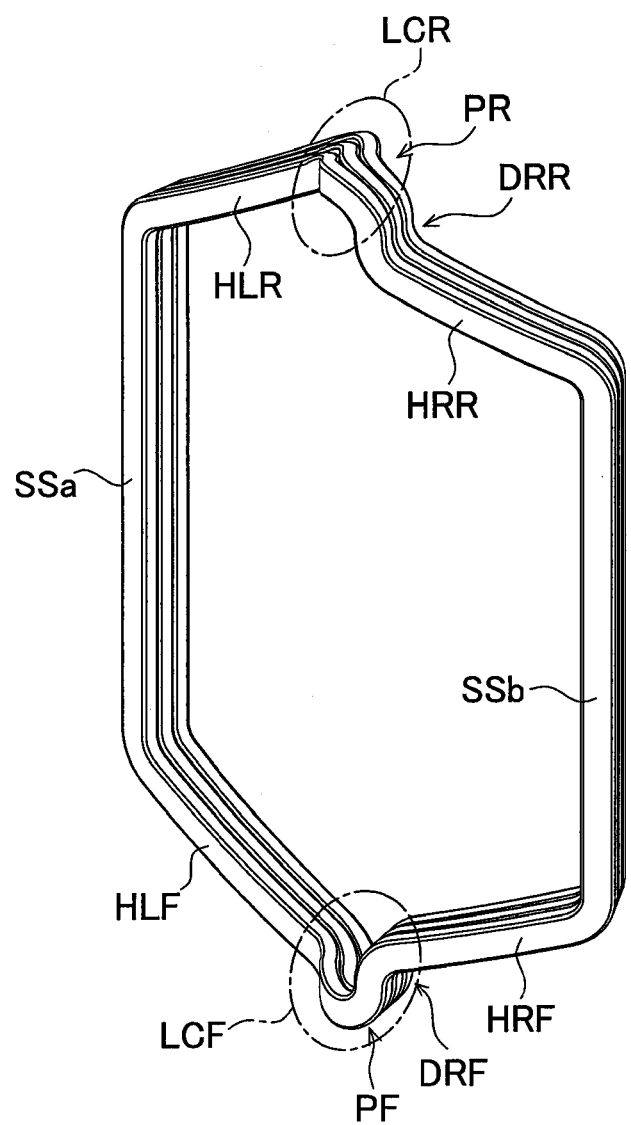
FIG. 15 is a perspective view of a one-side protrusion-formed coil in a third embodiment.

FIG. 15 is a perspective view of the one-side protrusion-formed coil in the third embodiment.

The one-side protrusion-formed coil CO4 is formed, as shown in FIG. 15, with a first oblique side portion HLR, a second oblique side portion HRR, a third oblique side portion HLF, and a fourth oblique side portion HRF. A lead-side protrusion PR is formed in an extension of the second oblique side portion HRR and the first oblique side portion HLR is formed linearly to a lead-side lane-change portion LCR. A non-lead-side protrusion PF is formed in an extension of the fourth oblique side portion HRF and the third oblique side portion HLF is formed linearly to a non-lead-side lane-change portion LCF.

Specifically, since the one-side protrusion-formed coil CO4 includes the lead-side protrusion PR and the non-lead-side protrusion PF in only one sides of the oblique side portions, a lead-side right recess DRR and a non-lead-side right recess DRF are formed, but the lead-side left recess DLR and the non-lead-side left recess DLF as shown in the first embodiment are not formed. This shape can be considered as a reverse shape to the one-side protrusion-formed coil CO3 in the second embodiment. Accordingly, the fundamental structure of a coil protrusion forming jig J1 is identical to that in the first embodiment, excepting that the third embodiment needs to change the placement and the number of press jigs J13 as in the second embodiment. However, a basic forming process is substantially the same and its explanation is not repeated herein.

Figure 16:
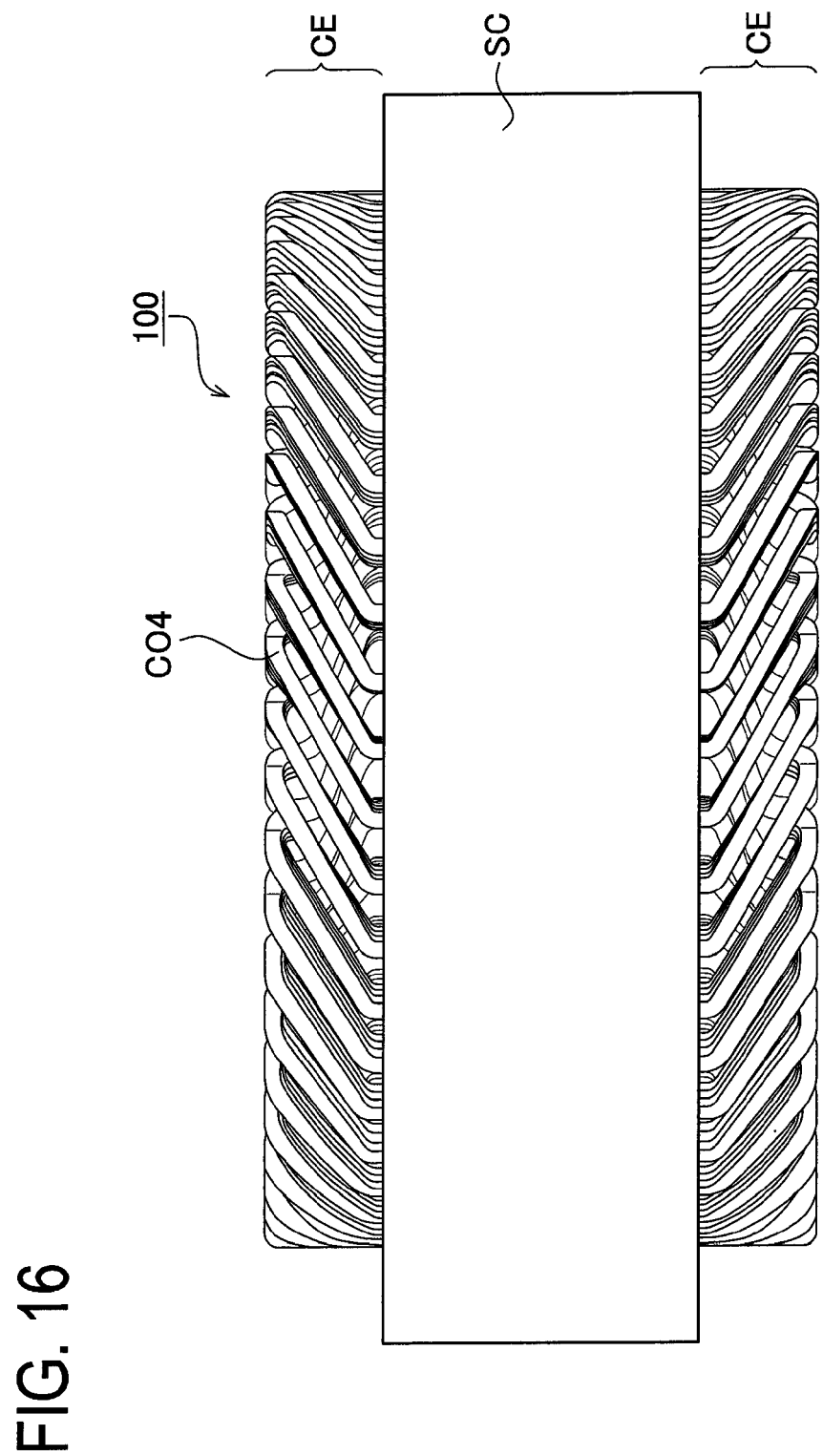
FIG. 16 is a side view of a stator using the one-side protrusion-formed coil in the third embodiment.

FIG. 16 is a side view of the stator using the one-side protrusion-formed coils. A first terminal portion TRa and a second terminal portion TRb are omitted for convenience of explanation.

The lead-side protrusion PR and the non-lead-side protrusion PF provided in the one-side protrusion-formed coil CO4 operate similar to those in the first embodiment. Accordingly, the same advantages are obtained that the non-lead-side protrusion PF formed in the one-side protrusion-formed coil CO4 can provide a short coil end CE.

FIG. 16 is a side view of the stator 100 seen from outside. The one-side protrusion-formed coils CO4 are assembled into a cage coil CB and combined with a split stator core SC.

Thus, when seen from the outer circumferential side of the cage coil CB, the second oblique side portions HRR appear as being stacked one on another. When seen from the outer circumferential side not shown of the cage coil CB, the lead-side protrusions PR appear as being arranged side by side. The same state applies to the non-lead-side protrusions PF.

In practice, the first terminal portion TRa and the second terminal portion TRb are formed, even though no explanation is given thereto. Accordingly, the stator 100 has to be subjected to a process of electrically connecting the terminal portions with bus bars BB.

Since the stator 100 is configured as above, the adjacent coils CO4 can detour around each other in three dimensions. However, the design freedom is lower, as with the one-side protrusion-formed coil CO3 in the second embodiment, than the case of using the protrusion-formed coil CO1 in the first embodiment.

Under the influence of the positions of the lead-side lane-change portion LCR and the non-lead-side lane-change portion LCF, the effect of shortening the coil end CE is lower in the third embodiment than the second embodiment.

A fourth embodiment of the present invention will be explained.

Fourth Embodiment

A stator 100 in the fourth embodiment is substantially identical in structure to the stator 100 in the first embodiment, excepting that a double coil 30 in the fourth embodiment corresponding to the protrusion-formed coil CO1 in the first embodiment is different in structure from the protrusion-formed coil CO1.

Figure 17:
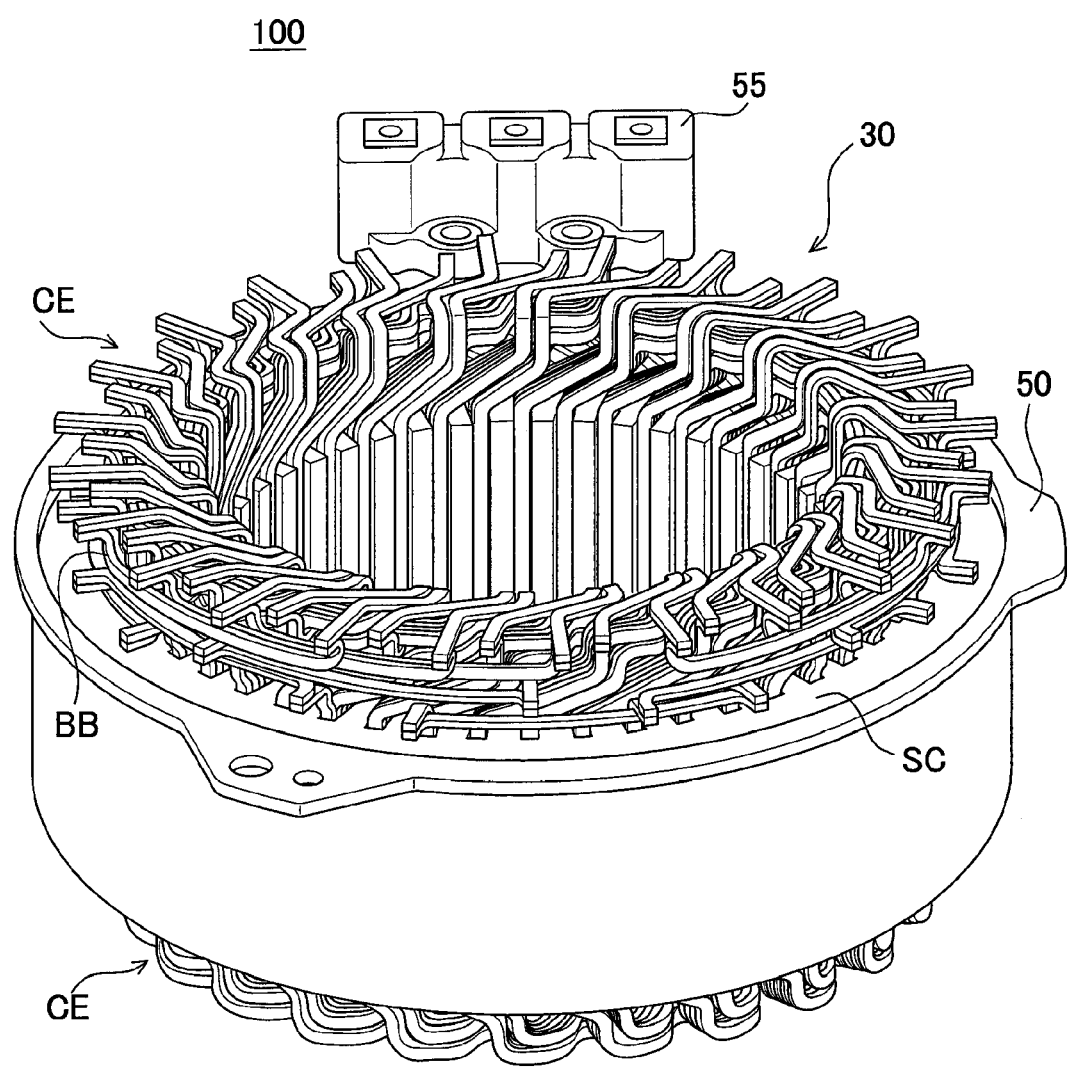
FIG. 17 is a perspective view of a stator in a fourth embodiment.
Figure 18:
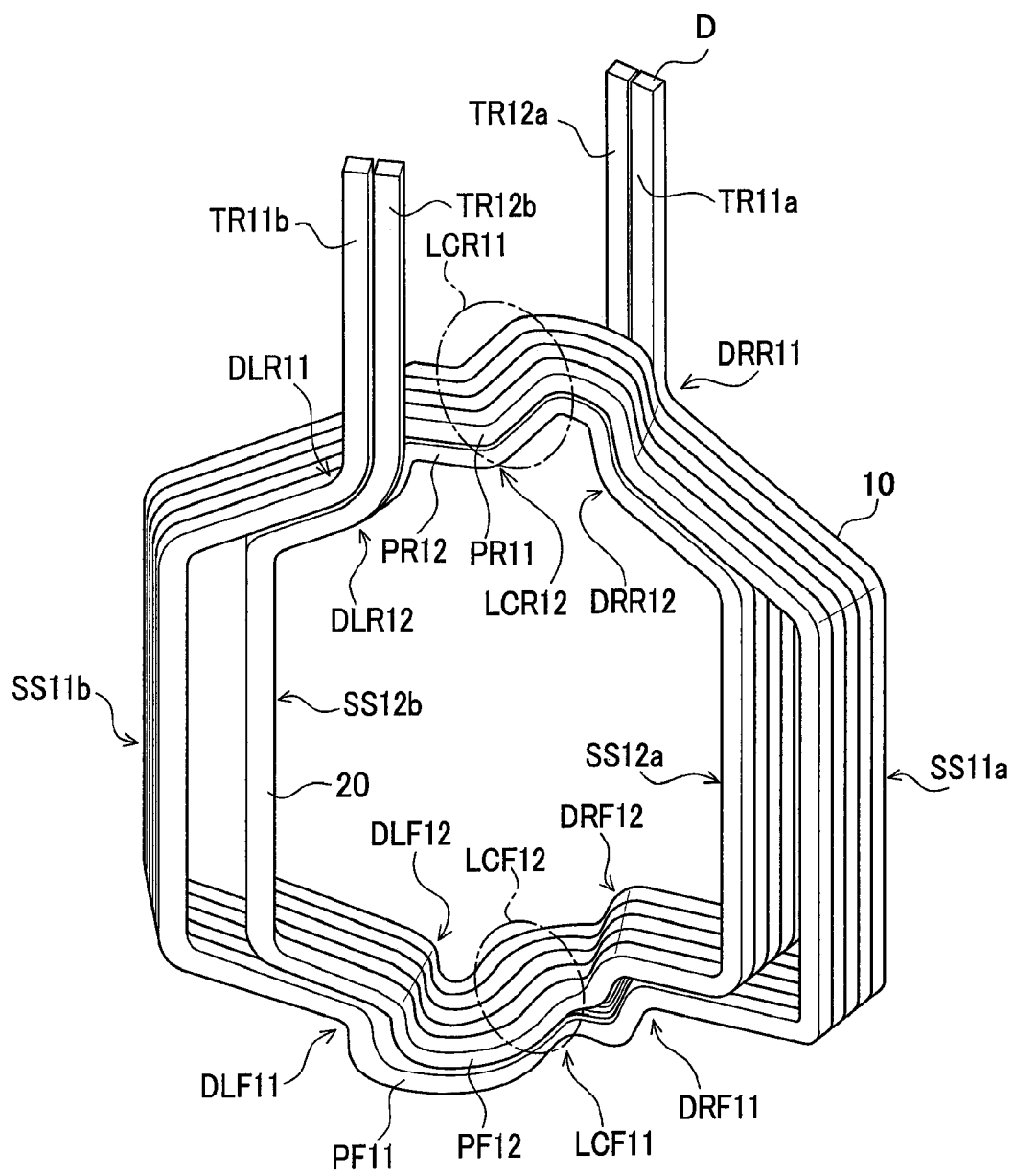
FIG. 18 is a perspective view of a double coil in the fourth embodiment.
Figure 19:
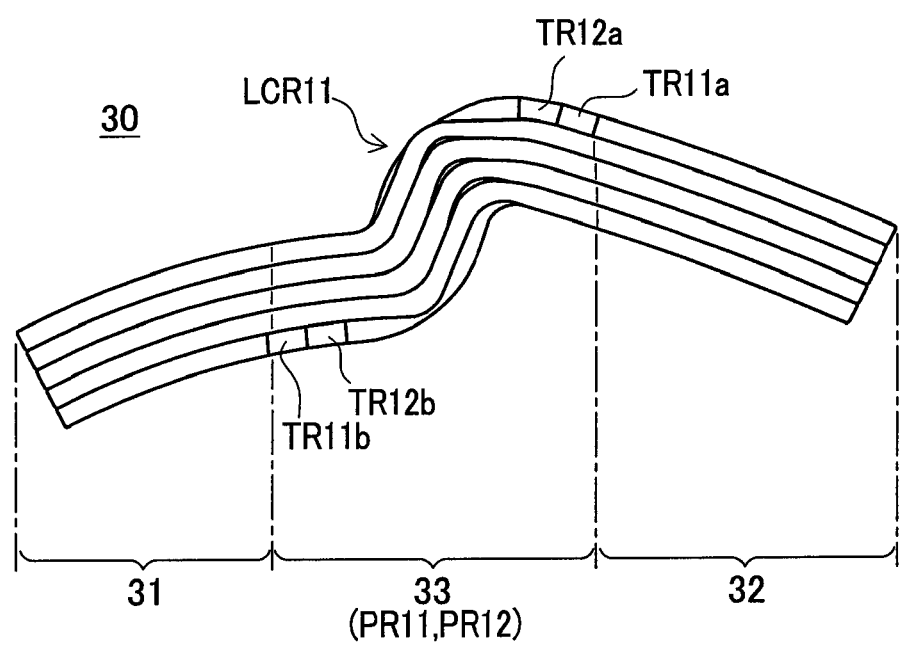
FIG. 19 is a top view of the double coil in the fourth embodiment.

FIG. 17 is a perspective view of the stator in the fourth embodiment. FIG. 18 is a perspective view of a double coil. FIG. 19 is a top view of the double coil seen from above in FIG. 18.

The stator 100 includes a double coil 30, a split stator core SC, an outer ring 50, and a terminal stand 55. The double coil 30 is connected with bus bars BB and a coil end portion is tilted.

The double coil 30 includes a first loop coil 10 and a second loop coil 20 as shown in FIG. 18. Each of the first loop coil 10 and the second loop coil 20 is formed of a wound flat rectangular conductor (conductor wire) D. This flat rectangular conductor D is made of a metal wire having a rectangular cross section and coated with insulating resin. The metal wire is made of high insulating metal and the insulating resin is high insulating resin such enamel and PPS.

The first loop coil 10 includes a first terminal portion TR11a and a second terminal portion TR11b, and also a lead-side protrusion PR11 and a non-lead-side protrusion PF11. On both sides of the lead-side protrusion PR11, a right recess DRR11 and a left recess DLR11 are formed. On both sides of non-lead-side protrusion PF11, a right recess DRF11 and a left recess DLF11 are formed. Further, the lead-side protrusion PR11 is formed with a lane-change portion LCR11 and the non-lead-side protrusion PF11 is formed with a non-lead-side lane-change portion LCF11.

The first loop coil 10 also includes a first in-slot conductor portion SS11a and a second in-slot conductor portion SS11b which are to be inserted in slots SCS of the stator core SC.

The second loop coil 20 includes, as with the first loop coil 10, a first terminal portion TR12a and a second terminal portion TR12b. Further, a lead-side protrusion PR12 and a non-lead-side protrusion PF12 are formed. On both sides of the lead-side protrusion PR12, a right recess DRR12 and a left recess DLR12 are formed. On both sides of the non-lead-side protrusion PF12, a right recess DRF12 and a left recess DLF12 are formed. The lead-side protrusion PR12 is formed with a lane-change portion LCR12 and the non-lead-side protrusion PF12 is formed with a non-lead-side lane-change portion LCF 12.

The second loop coil 20 also includes a first in-slot conductor portion SS12a and a second in-slot conductor portion SS12b.

The double coil 30 is assembled by stacking the second loop coil 20 on the inner circumferential side of the first loop coil 10.

A forming logic of the lead-side protrusion PR11 and the non-lead-side protrusion PF11 in the first loop coil 10 and the lead-side protrusion PR12 and the non-lead-side protrusion PF12 in the second loop coil 20 is similar to that of the lead-side protrusion PR and the non-lead-side protrusion PF in the first embodiment and therefore the details thereof are not repeated herein.

The split stator core SC consists of twenty-four pieces 41 each of which is made of laminated electromagnetic steel plates and arranged in a cylindrical form, and the outer ring 50 is fit on the stator core SC to hold the double coils 30.

The stator core SC is provided, on its inner circumferential side, the slots SCS and the teeth 43 alternately arranged. Each piece 41 has a shape divided in the bottoms of the slots SCS to include two teeth 43.

The outer ring 50 is made of metal in a cylindrical shape and with such a size that an inner periphery thereof conforms to an outer periphery of the stator core SC. The outer ring 50 is mounted around the stator core SC by shrink fitting. Accordingly, the inner periphery of the outer ring 50 is designed to be slightly smaller than the outer periphery of the stator core SC.

The terminal stand 55 is a connection port to be connected with an external connector not shown for the purpose of e.g. supplying electric power to the double coils 30 of the stator 100 after having been electrically connected, from a power source such as a secondary battery. In the fourth embodiment, the stator is configured for three phases and hence three connection ports are provided.

A forming method of the coil in the fourth embodiment is basically the same as the method explained in the first embodiment referring to FIGS. 4 to 9.

In the fourth embodiment, differently from the protrusion-formed coil CO1 in the first embodiment, the cage coil CB consists of double coils 30 each including the first loop coil 10 and the second loop coil 20 in a stacked manner. Accordingly, two types of initial coils C1 need to be prepared.

Actually, the initial coil C1 for the first loop coil 10 and the initial coil C1 for the second loop coil 20 are different in circumferential length. The shapes of the center holder J11 and the protrusion guide J12 of the coil protrusion forming jig J1 are practically different between the initial coil C1 for the first loop coil 10 and the initial coil C1 for the second loop coil 20. It is therefore necessary to prepare separate jigs suitable for the initial coils C1 respectively or a changeable guide mechanism.

Since the structure of the coil protrusion forming jig J1 is almost similar, it is treated herein as the same jig for convenience.

The completed first loop coil 10 and second loop coil 20 are stacked to form the double coil 30. This double coil 30 includes three zones three zones as shown in FIG. 19; that is, an inner-circumferential zone 31, an outer-circumferential zone 32, and a protruding lane-change zone 33. This lane-change zone 33 is defined as a generic term of a range corresponding to the lead-side lane-change portion LCR11 of the lead-side protrusion PR11 or the non-lead-side lane-change portion LCF11 of the non-lead-side protrusion PF11 in the first loop coil 10 and to the lead-side lane-change portion CLR12 of the lead-side protrusion PR12 or the non-lead-side lane-change portion LCF12 of the non-lead-side protrusion PF12 in the second loop coil 20.

After the double coils 30 are stacked in a cage form, completing the cage coil CB, the split stator core SC is inserted therein.

Figure 20:
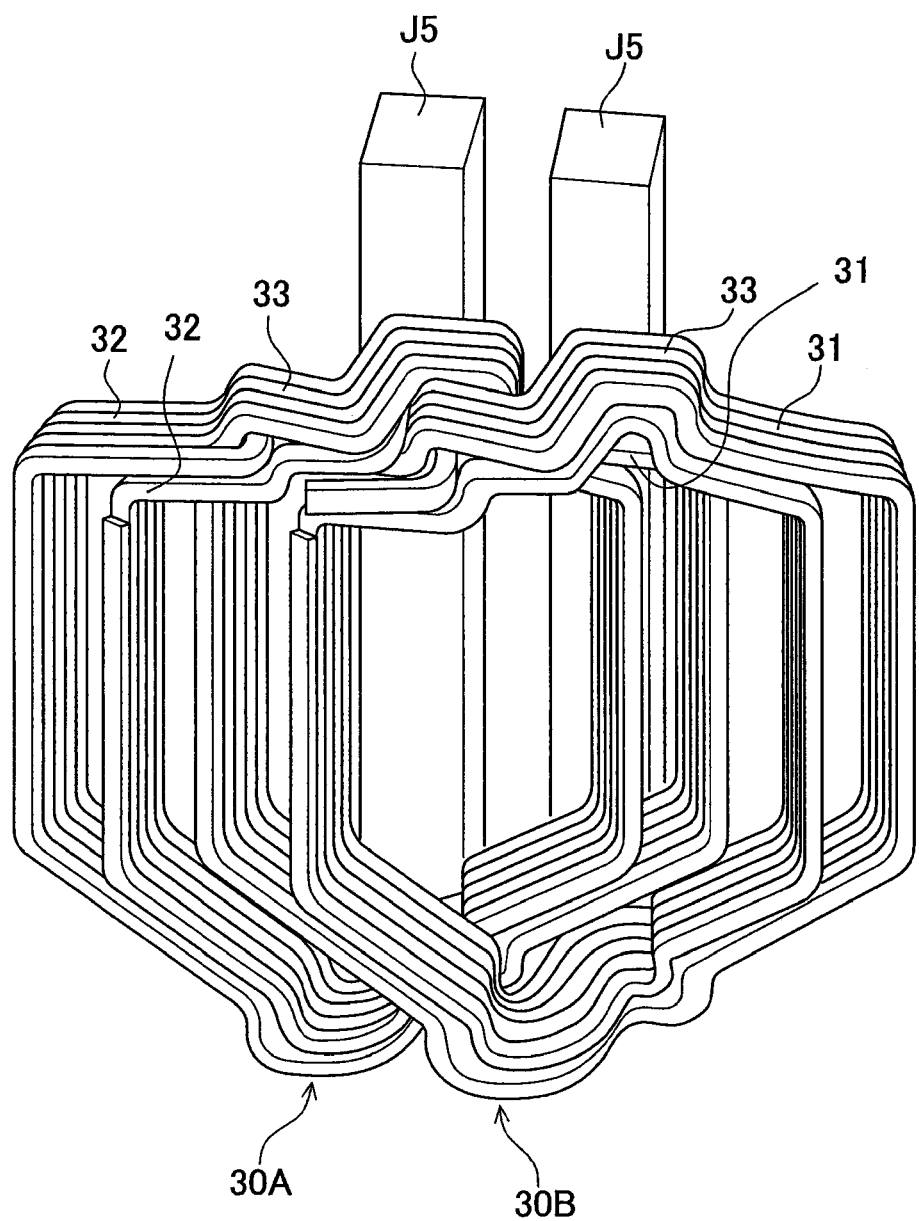
FIG. 20 is a schematic perspective view of the double coils stacked in the fourth embodiment.

FIG. 20 is a schematic perspective view of the stacked double coils. It is to be noted that a first terminal portion TR11a, a second terminal portion TR11b, a first terminal portion TR12a, and a second terminal portion TR12b are omitted for convenience of explanation.

A double coil 30A and a double coil 30B are double coils 30 having the same shape and are arranged so that respective lane-change zones 33 are adjacent as in FIG. 20. Accordingly, the inner circumferential zone 31 of the double coil 30B is located under the lane-change zone 33 of the double coil 30A.

On the other hand, the inner circumferential zone 31 of the double coil 30A is located under the lane-change zone 33 of the double coil 30B.

It is to be noted that positioning jigs J5 are illustrated behind the double coils 30A and 30B. The positioning jigs J5 serve to position the double coils 30.

Figure 21:
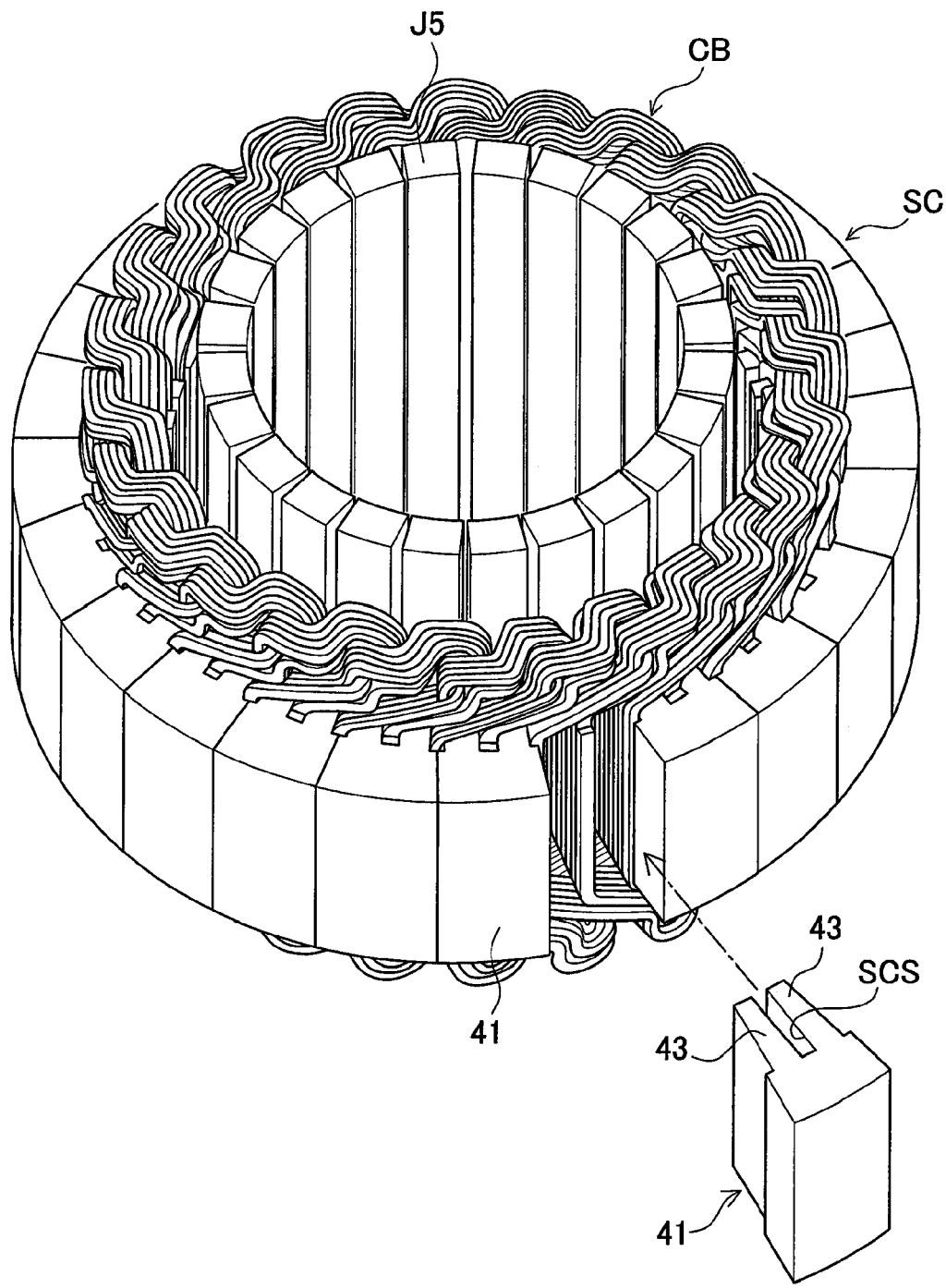
FIG. 21 is a perspective view showing a state where a piece is to be inserted in a cage coil in the fourth embodiment.

FIG. 21 is a perspective view showing a state where a piece is to be inserted in the cage coil. In this figure, as in FIG. 20, the first terminal portion TR11a, the second terminal portion TR11b, the first terminal portion TR12a, and the second terminal portion TR12b are omitted for convenience of explanation.

Figure 22:
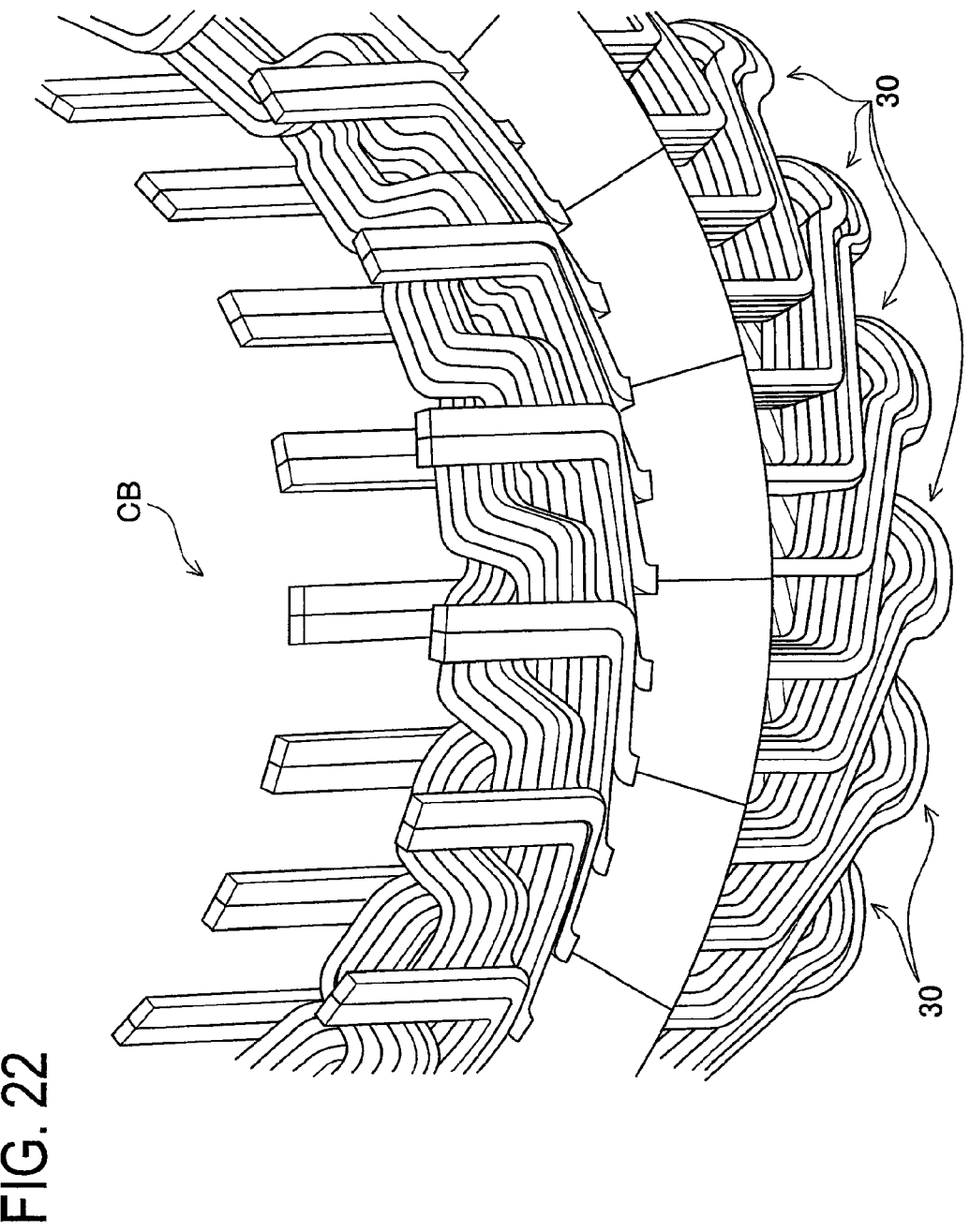
FIG. 22 is a schematic view showing a state where the pieces are inserted in the cage coil in the fourth embodiment.

FIG. 22 is a perspective view showing a state where the pieces are inserted in the cage coil. The pieces in FIG. 22 appear as only upper surfaces for explanation.

The cage coil CB is constituted of the double coils 30 sequentially stacked as shown in FIG. 20. This cage coil CB includes twenty-four double coils 30. The pieces 41 are inserted therein from outside, completing the cylindrical split stator core SC.

Finally, the outer ring 50 is shrink-fitted on the outer periphery of the stator core SC as shown in FIG. 17. The stator 100 is thus completed.

In the cage coil CB, as shown in FIG. 22, the first terminal portion TR11a, the second terminal portion TR11b, the first terminal portion TR12a, and the second terminal portion TR12b are formed to protrude. After shrink-fitting of the outer ring 50, those terminal portions TR11a, TR11b, TR12a, and TR12b are bent outward and connected with bus bars into a state shown in FIG. 17.

Figure 23:
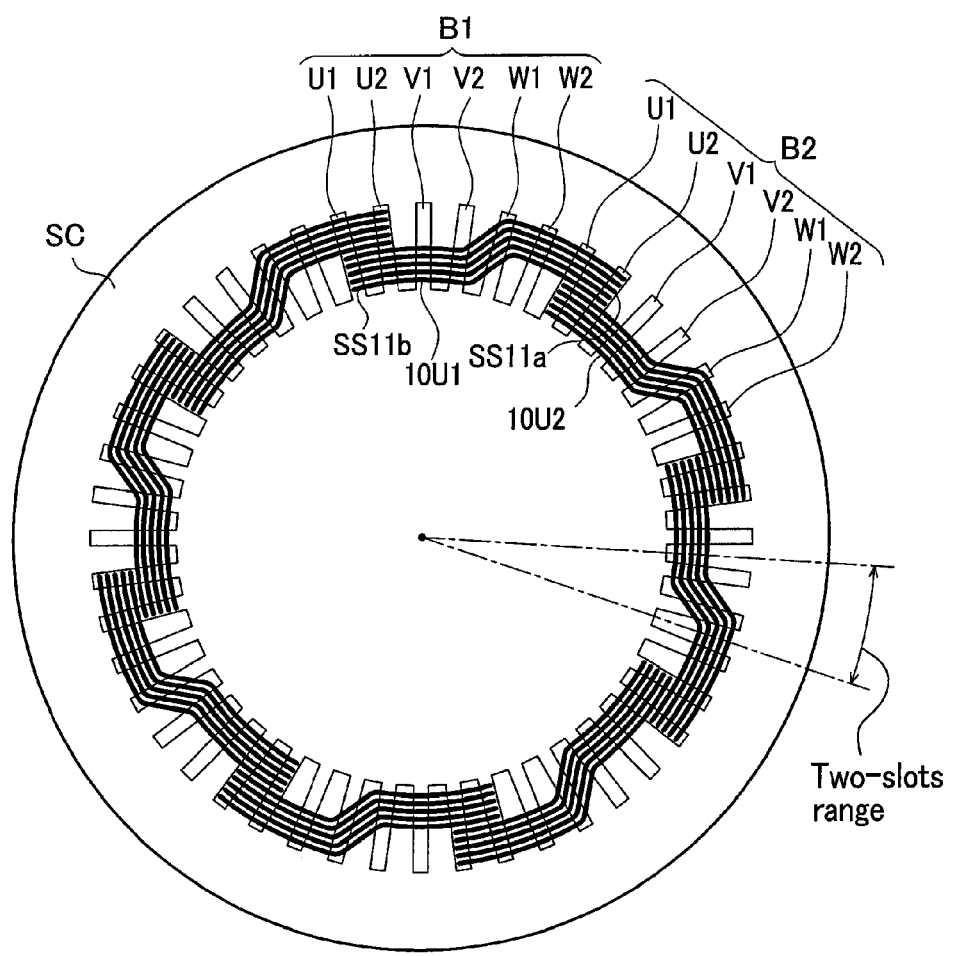
FIG. 23 is a schematic plan view showing first loops of U-phase coils in a stator core in the fourth embodiment.
Figure 24:
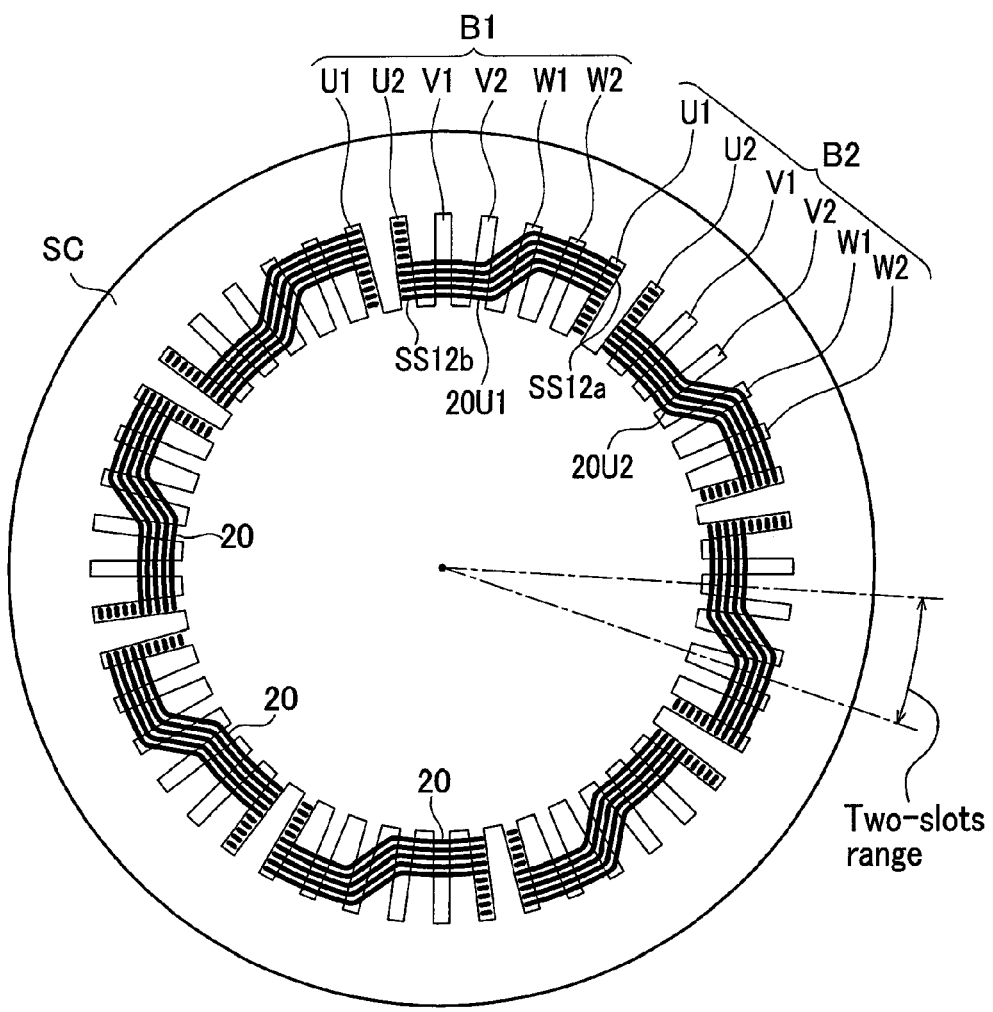
FIG. 24 is a plan view showing second loops of the U-phase coils in the stator core in the fourth embodiment.

FIG. 23 is a schematic plan view showing first loops of U-phase coils in the stator core. FIG. 24 is a schematic plan view showing second loops of the U-phase coils in the stator core. Assuming a U phase, a V phase, and a W phase are referred to as one block, the stator 100 consists of eight blocks. A first block B1 includes six slots, i.e., a U-phase first slot U1B1, a U-phase second slot U2B1, a V-phase first slot V1B1, a V-phase second slot V2B1, a W-phase first slot W1B1, and a W-phase second slot W2B1. A second block B2 includes six slots, i.e., a U-phase first slot U1B2, a U-phase second slot U2B2, a V-phase first slot V1B2, a V-phase second slot V2B2, a W-phase first slot W1B2, and a W-phase second slots W2B2.

A first loop coil 10U1 of the double coil 30 is arranged as shown in FIG. 23 so that a second in-slot conductor portion SS11b is inserted in the U-phase first slot U1B1 and a first in-slot conductor portion SS11a is inserted in the U-phase second slot U2B2.

On the other hand, a second loop coil 20U1 of the double coil 30 is arranged as shown in FIG. 24 so that a second in-slot conductor portion SS12b is inserted in the U-phase second slot U2B1 and a first in-slot conductor portion SS12a is inserted in the U-phase first slot U1B2.

The stator 100 in the fourth embodiment is configured as above and hence can exhibit the following operations and advantages.

Firstly, the stator 100 can develop high power and achieve downsizing.

The stator 100 in the fourth embodiment includes the split stator core SC including the teeth 43 and the slots SCS formed between the teeth 43, and the double coils 30 each being made of the flat rectangular conductor D and arranged in the slots SCS. The slots SCS include the first block B1 as a three-phase slot block including the U-phase first slot U1B1, the U-phase second slot U2B1, the V-phase first slot V1B1, the V-phase second slot V2B1, the W-phase first slot W1B1, and the W-phase second slot W2B1. Adjacent to the first block B1, the second block B2 is formed as a three-phase slot block. The conductor D in the first slot U1B1 of the first block B1 and the conductor D in the U-phase slot U2B2 of the second block B2 form the first loop coil 10. The conductor D in the U-phase second slot U2B1 of the first block B1 and the conductor D in the U-phase first slot U1B2 of the second block B2 form the second loop coil 20. The second loop coil 20 is placed in the inner circumference of the first loop coil 10.

Accordingly, when the stator 100 is to be formed in a distributed winding manner using concentrically wound coils formed as the double coil 30, the range to be used for the lane-change zone 33 can be ensured.

As the number of turns of each double coil 30 increases, or as the width of the flat rectangular conductor D used for the double coil 30 is thicker, the protruding lane-change zone 33 of the double coil 30 tends to be hard to form. This may become an obstacle to increasing the space factor of the stator 100 and enhancing output power. However, each double coil 30 is configured by stacking the first loop coil 10 and the second loop coil 20, so that the range to be used for the protruding lane-change zone 33 can be increased. Accordingly, the space factor of the stator 100 can be increased, contributing to development of high output power.

To be concrete, the range for forming the lane-change zone 33 is determined to correspond to two slots as shown in FIGS. 23 and 24. It is therefore possible to increase the number of turns of the first loop coil 10 and the second loop coil 20 in the double coil 30 or increase the thickness of the flat rectangular conductor D. In view of the minimum bending radius of the flat rectangular conductor D, damage on an insulating layer provided around the flat rectangular conductor D, and other problems, it is not preferable to bend a bending portion of the protruding lane-change zone 33 at an acute angle. Depending on what range is usable for the protruding lane-change zone 33, the number of turns of the first loop coil 10 and the second loop coil 20 or the thickness of the flat rectangular conductor D are determined.

However, for high output power, it is essential to increase the thickness of the flat rectangular conductor D and the number of turns. Thus, it is highly advantageous to use a range corresponding to two slots (a two-slots range) for the protruding lane-change zone 33.

In the case where a single stacked coil is used in a stator, a lane change can only use a range corresponding to one slot at most. In contrast, the stator 100 in the fourth embodiment using the double stacked coils 30 allows a range corresponding to two slots to be used for forming one protruding lane-change zone 33. This configuration contributes to development of high output power of the stator 100 and also enhancement of design freedom.

Since the first loop coil 10 and the second loop coil 20 are stacked to form the double coil 30, the space for the lane-change zone 33 is ensured as mentioned above. Thus, there is no need to elongate the coil end in the axial direction of the stator 100. This contributes to shortening of the coil end CE.

The first terminal portion TR11a, the second terminal portion TR11b, the first terminal portion TR12a, and the second terminal portion TR12b and the bus bars BB connected to the terminal portions are connected by welding or others and then tilted radially outward as shown in FIG. 17. Consequently, the extension of the coil end CE can be minimized.

Since the coil end CE of the stator 100 is not made larger beyond necessity, the demand for downsizing can be satisfied.

Furthermore, the first loop coil 10 is provided with the lead-side protrusion PR11 and the non-lead-side protrusion PF11, the second loop coil 20 is provided with the lead-side protrusion PR12 and the non-lead-side protrusion PF12. This makes it possible to prevent the interference between adjacent coils and minimize the length of the coil end CE.

Patent Literature 2 and others adopts a configuration that a first loop coil 10 and a second loop coil 20 are formed in hexagonal shape so that one apex of the hexagonal shape is located in a coil end. However, such configuration likely results in a large coil end.

This is because a flat rectangular conductor D has to be bent obliquely in the coil end portion to detour around the adjacent coils, the distance between the adjacent coils is likely to be longer unless the angle of the one apex of the hexagonal shape protruding in the coil end is made acute.

On the other hand, in the case where a protrusion is provided as in the first loop coil 10 and the second loop coil 20 in the fourth embodiment, the flat rectangular conductor D can avoid interference in three dimensions.

To be concrete, the inner circumferential zone 31 or the outer circumferential zone 32 is stacked under the lane-change zone 33, so that the lane-change zones 33 are arranged in the coil end CE. This can contribute to shortening of the coil end CE. In the fourth embodiment, the double coils 30 having the same shape are stacked to form the cage coil CB. Accordingly, a manufacturing cost of components can be reduced and an assembling process can be made simple.

A fifth embodiment of the present invention will be explained below.

Fifth Embodiment

Figure 25:
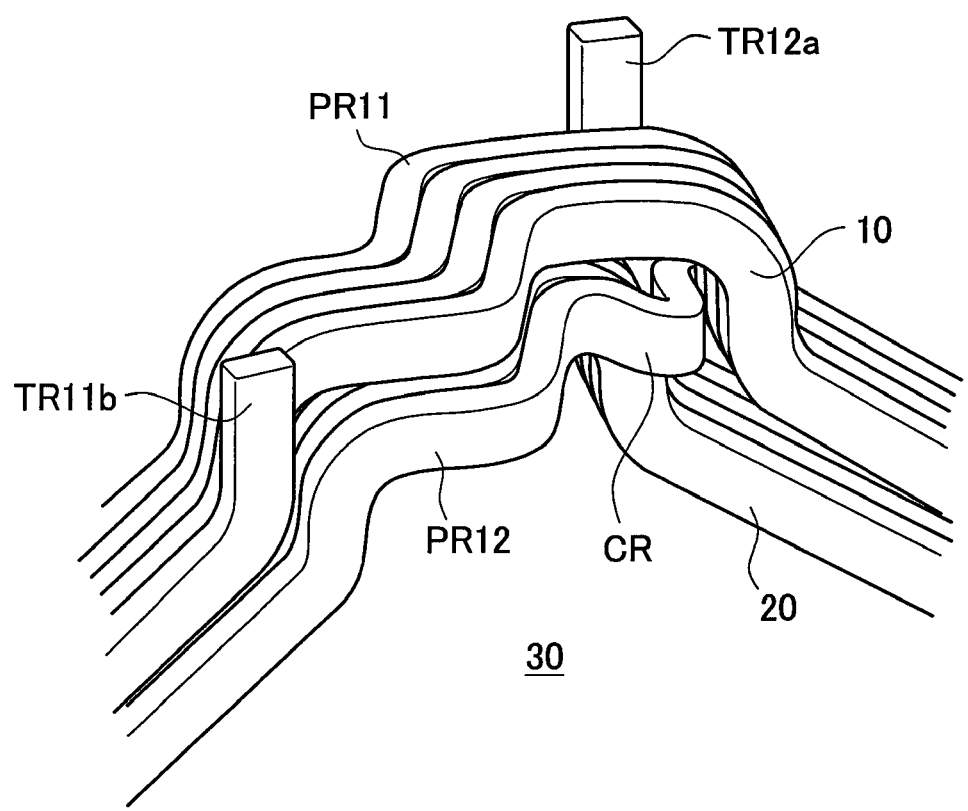
FIG. 25 is a partial perspective view of a coil end of a double coil in a fifth embodiment.
Figure 26:
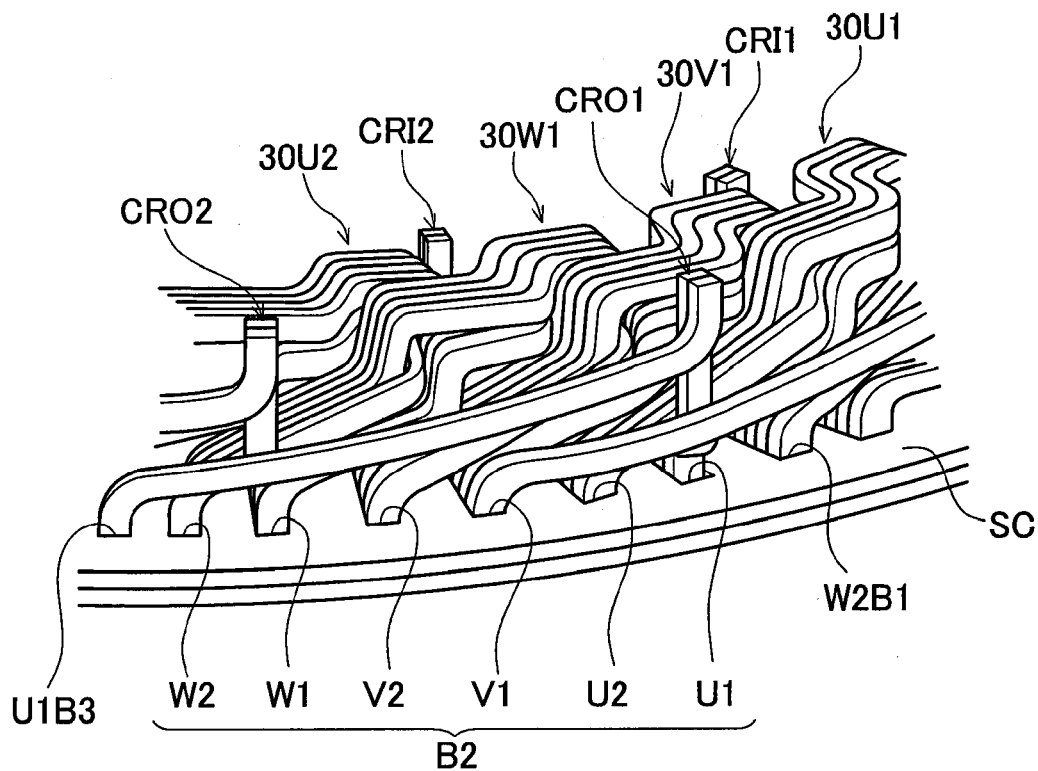
FIG. 26 is a partial perspective view of a stator in the fifth embodiment.
Figure 26:

A stator 100 in the fifth embodiment is almost identical in structure to the stator 100 in the fourth embodiment, excepting a method of forming a double stacked coil 30 in a slightly different manner from in the fourth embodiment. This method is explained below. FIG. 25 is a partial perspective view of a coil end portion of a double coil in the fifth embodiment. FIG. 26 is a partial perspective view of a stator.

The double coil 30 used in the fifth embodiment includes a first loop coil 10 and a second loop coil 20 connected with a connecting portion CR shown in FIG. 25 without using a bus bar BB. That is, the first terminal portion TR11a of the first loop coil 10 is connected to the second terminal portion TR12b of the second loop coil 20 in the fourth embodiment shown in FIG. 18, forming the connecting portion CR as shown in FIG. 25.

The connecting portion CR passes under lead-side protrusions PR11 and goes across side surfaces of lead-side protrusions PR12 to connect the inner circumferential side to the outer circumferential side. As shown in FIG. 26, a terminal portion of the second loop coil 20 is elongated to form the connecting portion CR which is connected to the first loop coil 10 on the outer circumference side of the stator 100.

Accordingly, in each double coil 30, two parts protrude on the coil end CE side, that is, a second terminal portion TR11b of the first loop coil 10 and a first terminal portion TR12a of the second loop coil 20.

To form a cage coil CB from the double coils 30, forty-eight double coils are prepared in each of which the first terminal portion TR11a is connected to the second terminal portion TR12b to form the connecting portion CR. However, the second terminal portion TR11b and the first terminal portion TR12a need to be different in shape for the reason mentioned below. In practice, therefore, twenty-four double coils 30 each of which is formed with a long second terminal portion TR11b and twenty-four double coils 30 each of which is formed with a long first terminal portion TR12a are prepared.

The first terminal portion TR12a extending from the outer circumferential side of the U-phase first slot U1B2 of the second block B2 as shown in FIG. 26 is connected to the first terminal portion TR12a extending from the outer circumferential side of the U-phase first slot U1B3 of the third block B3. This is referred to as a first outer-circumferential connecting portion CRO1. That is, adjacent double coils 30 of the same phase are connected to each other. In FIG. 26, the U-phase first coil 30U1 is connected to the U-phase second coil 30U2.

Although a second terminal portion TR11b placed on the inner circumferential side is not illustrated, it is similarly connected to the second terminal portion TR11b of an adjacent coil of the same phase. In the case of FIG. 26, it is connected to a U-phase eighth coil 30U8 not shown, forming a first inner-circumferential connecting portion CR11.

Similarly, second terminal portions TR11b of a V-phase first coil 30V1 and a V-phase second coil 30V2 placed on the inner circumferential side in the stator 100 are connected to form a second inner-circumferential side connecting portion CRI2. First terminal portions TR12a of the V-phase second coil 30V2 and a V-phase third coil 30V3 are connected to form a second outer-circumferential connecting portion CRO2. In this way, the second terminal portions TR11b placed on the inner circumferential side of the stator 100 are connected to each other to form inner-circumferential connecting portions CRI and the first terminal portions TR12a placed on the outer circumferential side of the stator 100 are connected to each other to form outer-circumferential connecting portions CRO, thereby electrically connecting the double coils 30 in the stator 100. Thus, an electric circuit of the stator 100 is established.

According to the positions of the double coils 30, as mentioned above, the double coils 30 need to include a shape having the second terminal portion TR11b and having the first terminal portion TR12a both being simply extending upward and a shape having the second terminal portion TR11b and the first terminal portion TR12a both extending up to the terminal portions TR11b and TR12a of a coil of an adjacent phase. The double coils 30 are therefore prepared in two patterns.

Connection between the second terminal portions TR11b and connection between the first terminal portions TR12a of coils of adjacent phases may be conducted by use of bus bars BB.

In the stator 100 in the fifth embodiment, connecting of the first loop coil 10 and the second loop coil 20 is not conducted after the double coils 30 are combined with the split stator core SC in the stator 100. The stator 100 is therefore easy to produce.

A reduction in the number of connecting steps in the coil end CE can ensure a work space and other advantages, contributing to an increase in yield.

It is however necessary to alternately assemble the double coils 30 of two patterns, differently from the fourth embodiment, resulting in somewhat complicated assembling process. However, the coil end of the stator 100 in the fifth embodiment can be shorter than that of the stator 100 in the fourth embodiment. Further, the structure shown in FIGS. 25 and 26 needs no bus bar BB, which contributes to a reduction in the number of components.

A sixth embodiment of the present invention will be explained below.

Sixth Embodiment

Figure 27:
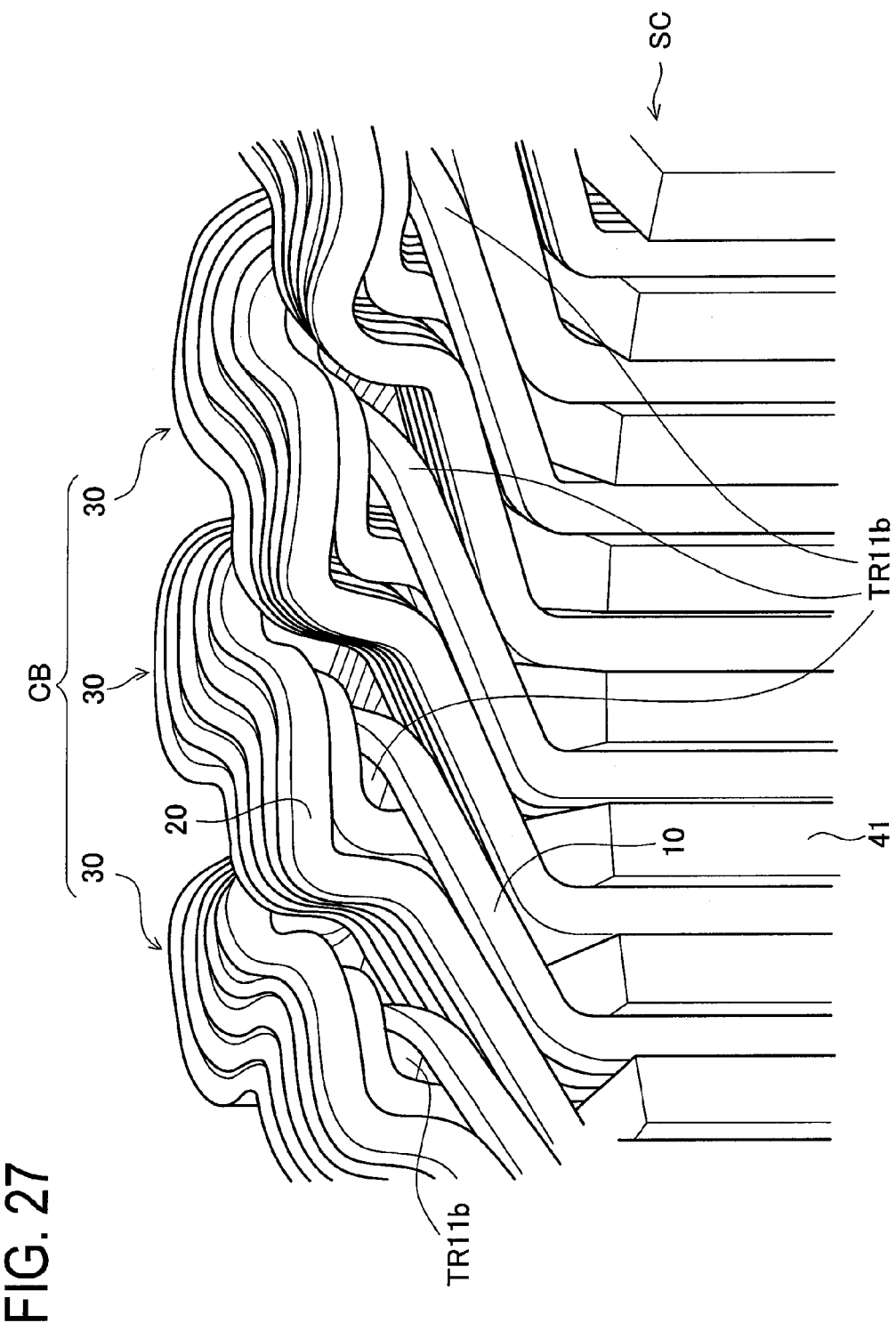
FIG. 27 is a partial perspective view of a coil end portion of a double coil in a sixth embodiment, seen from an inner circumferential side.
Figure 28:
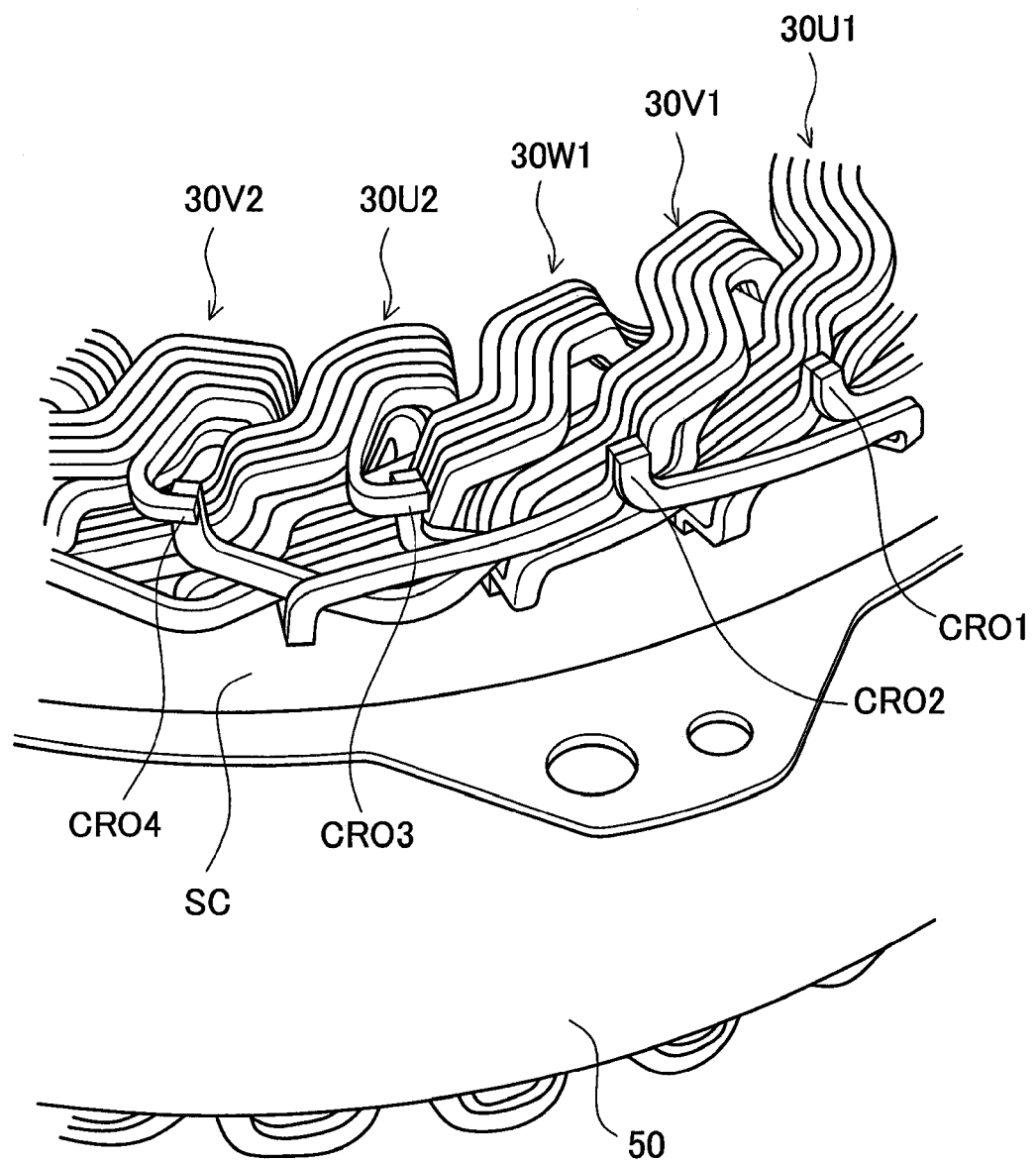
FIG. 28 is a partial perspective view of the coil end portion of the double coil in the sixth embodiment, seen from an outer circumferential side.

A stator 100 in the sixth embodiment is almost identical in structure to the stator 100 in the fifth embodiment, excepting the shape of the double coils 30 and a connecting method of the double coils 30, which will be explained below. FIG. 27 is a partial perspective view of a coil end portion of stacked double coils in the sixth embodiment, seen from the inner circumferential side. FIG. 28 is a partial perspective view of the coil end portion of the double coils seen from the outer circumferential side. The double coils 30 in the sixth embodiment are shown in the form of a cage coil CB in which pieces 41 of a split stator core SC are inserted. The basic shape of the double coils 30 is almost the same as the double coils 30 in the fifth embodiment, in which the first loop coils 10 and the second loop coils 20 are connected.

However, as shown in FIG. 28, a U-phase first coil 30U1, a V-phase first coil 30V1, a W-phase first coil 30W1, a U-phase second coil 30U2, and a V-phase second coil 30V2 are different in shape.

Each double coil 30 is arranged so that a second terminal portion TR11b placed on the inner circumferential side of the stator 100 as shown in FIG. 27 passes under a lead-side protrusion PR12 of the second loop coil 20 to extend to the outer circumferential side. The double coils 30 are assembled into a cage coil CB. A first outer-circumferential connecting portion CRO1 to a fourth outer-circumferential connecting portion CRO4 are formed on the outer circumferential side of the stator 100.

Since the outer-circumferential connecting portions CRO are formed on the outer circumferential side of the stator 100 in the sixth embodiment as above, the cage coil CB is electrically connected, thus achieving a short coil end.

There is no need to form inner-circumferential connecting portions CRI, unlike the stator 100 in the fifth embodiment. Accordingly, the stator 100 in the sixth embodiment includes no protrusion on the inner circumferential side and thus does not interfere with a rotor not shown.

Even though the outer-circumferential connecting portions CRO project to a place corresponding to the outer circumferential portion of a split stator core SC, the connecting portions CRO interfere with nothing. Accordingly, this configuration needs somewhat complicated winding of a flat rectangular conductor D but can enhance design freedom.

The present invention is explained in the above embodiments but is not limited thereto. The present invention may be embodied in other specific forms without departing from the essential characteristics thereof.

For instance, in the coil end CE in the first embodiment, the first terminal portion TRa and the second terminal portion TRb may be connected as in the fifth and sixth embodiments without using the bus bars BB.

Further, the number of turns of each of the protrusion-formed coil CO1, the one-side protrusion-formed coil CO3, the one-side protrusion-formed coil CO4, and the double coil 30 and the thickness of the flat rectangular conductor D are determined according to design requirements. For instance, the number of turns and the cross-sectional area of the flat rectangular conductor D may be increased or decreased.

Any connecting pattern of the first terminal portion TRa and the second terminal portion TRb in the coil end CE may be adopted other than those explained in the first to sixth embodiments.

REFERENCE SIGNS LIST

31 Inner-circumferential zone
32 Outer-circumferential zone
33 Lane change zone
41 Piece
43 Teeth
50 Outer ring
100 Stator
B1 First block
B2 Second block
BB Bus bar
C1 Initial coil
C2 Protrusion including coil
C3 Curve including coil
C4 Lane-change including coil
CB Cage coil
CE Coil end
CO1 Protrusion-formed coil
CR Connecting portion
D Flat rectangular conductor
LCF Non-lead-side lane-change portion
LCR Lead-side lane-change portion
PF Non-lead-side protrusion
PR Lead-side protrusion

The invention claimed is:

1. A stator comprising: a stator core including teeth and slots formed between the teeth; and coils each being made of a flat rectangular conductor and placed in the slots, wherein
each coil has a shape including, in a coil end portion, oblique side portions and a protrusion formed to protrude upward in an axial direction of the stator core from the oblique side portions,
the protrusion has a height to avoid interference between the coils placed in the stator core, and
the coil end portion of each coil is formed with a lane-change portion,
a coil interference-point distance between a first interference point at which a first coil and a second coil arranged adjacently interfere with each other and a second interference point at which the second coil and a third coil arranged adjacently interfere with each other is determined to be equal to or shorter than a bending center-to-center distance defined as a distance in a circumferential direction of the stator core between a bending center on an inner circumferential side of the lane-change portion located on the inner circumferential side of the stator core and a bending center on an outer circumferential side of the lane-change portion located on the outer circumferential side of the stator core.

2. In the stator according to claim 1, wherein
the flat rectangular conductors are stacked and formed with the protrusions and the lane change portions.

3. In the stator according to claim 1, wherein
each coil is wound in a concentric winding pattern, and
the coils are arranged cylindrically to form a cage coil, and
the split stator core is inserted in the cage coil.

4. In the stator according to claim 2, wherein
each coil is wound in a concentric winding pattern, and
the coils are arranged cylindrically to form a cage coil, and
the split stator core is inserted in the cage coil.

* * * * *